(12) United States Patent
Kuusela et al.

(10) Patent No.: US 12,508,444 B2
(45) Date of Patent: Dec. 30, 2025

(54) USING ORGAN SIMILARITY METRIC TO DETERMINE OPTIMIZATION STRATEGY IN ADAPTIVE RADIATION THERAPY

(71) Applicant: Siemens Healthineers International AG, Steinhausen (CH)

(72) Inventors: Esa Kuusela, Espoo (FI); Juha Kauppinen, Espoo (FI)

(73) Assignee: SIEMENS HEALTHINEERS INTERNATIONAL AG, Steinhausen (CH)

(*) Notice: Subject to any disclaimer, the term of this patent is extended or adjusted under 35 U.S.C. 154(b) by 215 days.

(21) Appl. No.: 18/233,154

(22) Filed: Aug. 11, 2023

(65) Prior Publication Data
US 2025/0050133 A1    Feb. 13, 2025

(51) Int. Cl.
  *A61N 5/10*    (2006.01)
  *G16H 20/40*    (2018.01)
  *G16H 50/20*    (2018.01)

(52) U.S. Cl.
  CPC ......... *A61N 5/1038* (2013.01); *A61N 5/1031* (2013.01); *A61N 5/1036* (2013.01); *A61N 5/1045* (2013.01); *G16H 20/40* (2018.01); *G16H 50/20* (2018.01)

(58) Field of Classification Search
  CPC .. A61N 5/1038; A61N 5/1031; A61N 5/1036; A61N 5/1045; A61N 5/1047; A61N 5/1039; A61N 5/1064; A61N 5/1067; A61N 5/1071; A61N 2005/1074; G16H 20/40; G16H 50/20; G06T 7/0012; G06T 7/33; G06T 7/62
  See application file for complete search history.

(56) References Cited

U.S. PATENT DOCUMENTS

| | | | |
|---|---|---|---|
| 6,546,073 | B1 | 4/2003 | Lee |
| 6,741,671 | B2 | 5/2004 | Lee |
| 9,044,602 | B2 | 6/2015 | Kilby et al. |
| 9,067,064 | B2 | 6/2015 | Jiang et al. |
| 9,943,702 | B2 | 4/2018 | Kumar et al. |
| 10,661,097 | B2 | 5/2020 | Tallinen et al. |
| 10,744,344 | B2 | 8/2020 | Isola et al. |
| 10,821,300 | B2 | 11/2020 | Isola et al. |
| 11,163,527 | B2 | 11/2021 | Oberbreckling et al. |
| 11,167,151 | B2 | 11/2021 | Podgorsak et al. |
| 11,278,737 | B2 | 3/2022 | Peltola et al. |
| 2004/0001569 | A1 | 1/2004 | Luo |
| 2009/0060130 | A1 | 3/2009 | Wilkens et al. |

(Continued)

OTHER PUBLICATIONS

Extended European Search Report and European Search Opinion issued Oct. 21, 2024, in European Patent Application No. 24190397.0.

(Continued)

*Primary Examiner* — Kiho Kim

(74) *Attorney, Agent, or Firm* — Potomac Law Group, PLLC

(57) ABSTRACT

Systems, devices and methods for using similarity metrics to determine optimization strategy in adaptive radiation therapy, and systems and methods for an automated adaptive workflow to automatically adapt and optimize a treatment plan to a current treatment session using MLC leaf configurations selected based on calculated similarity metric values.

21 Claims, 21 Drawing Sheets

(56) References Cited

U.S. PATENT DOCUMENTS

| | | |
|---|---|---|
| 2010/0054411 A1 | 3/2010 | Nord et al. |
| 2016/0114192 A1 | 4/2016 | Lachaine et al. |
| 2016/0310761 A1 | 10/2016 | Li et al. |
| 2018/0111005 A1 | 4/2018 | Ranganathan et al. |
| 2019/0030365 A1* | 1/2019 | Ravi .................... A61N 5/1027 |
| 2019/0038916 A1 | 2/2019 | Ranganathan et al. |
| 2019/0054315 A1 | 2/2019 | Isola et al. |
| 2020/0101319 A1 | 4/2020 | Haas et al. |
| 2020/0121951 A1 | 4/2020 | Morgas et al. |
| 2020/0206533 A1 | 7/2020 | Laaksonen et al. |
| 2020/0388371 A1 | 12/2020 | Schreier et al. |
| 2021/0065360 A1 | 3/2021 | Laaksonen et al. |
| 2021/0069527 A1 | 3/2021 | Peltola et al. |
| 2021/0183070 A1 | 6/2021 | Laaksonen et al. |
| 2021/0220670 A1 | 7/2021 | Li et al. |
| 2021/0304402 A1 | 9/2021 | Morgas et al. |

OTHER PUBLICATIONS

Momin et al., "Knowledge-based radiation treatment planning: A data-driven method survey", J Appl Clin Med Phys, 2021, 22:16-14.
Carass et al., "Evaluating white matter lesion segmentations with refined Sorensen-Dice analysis", Scientific reports, 2020, 10:8242.
Zou et al., "Statistical validation of image segmentation quality based on a spatial overlap index", Scientific Report, Acad Radiol., Feb. 2004, 11(2):178-189.

* cited by examiner

USING ORGAN SIMILARITY METRIC TO DETERMINE OPTIMIZATION STRATEGY IN ADAPTIVE RADIATION THERAPY

FIELD

The present disclosure relates generally to adaptive radiation therapy, and more particularly, to systems, methods, and devices for using organ similarity metrics to optimize radiation treatment plans in volumetric-modulated arc therapy (VMAT).

BACKGROUND

Radiation therapy involves medical procedures that use external radiation beams to treat pathological anatomies (tumors, lesions, vascular malformations, nerve disorders, etc.) by delivering prescribed doses of radiation (X-rays, gamma rays, electrons, protons, and/or ions) to the pathological anatomy, while minimizing radiation exposure to the surrounding tissue and critical anatomical structures.

In general, a full radiotherapy planning and treatment workflow includes several phases: a treatment planning phase, a treatment delivery phase, and a monitoring and evaluating phase in which the progress of the treatment, e.g., the dose accumulation is monitored.

In the treatment planning phase, first a precise three-dimensional (3D) map of the anatomical structures in the area of interest (head, body, etc.) is constructed using any one of (or combinations thereof) a computed tomography (CT), cone-beam computed tomography (CBCT), magnetic resonance imaging (MRI), positron emission tomography (PET), 3D rotational angiography (3DRA), or ultrasound techniques. This determines the exact coordinates of the target within the anatomical structure, namely, locates the tumor or abnormality within the body and defines its exact shape and size. This is followed by a prescription step, where a motion path for the radiation beam is computed to deliver a dose distribution that the radiation oncologist finds acceptable, considering a variety of medical constraints. Then, a team of specialists develop a treatment plan using special computer software to optimally irradiate the tumor and minimize dose to the surrounding normal tissue by designing beams of radiation to converge on the target area from different angles and planes. The treatment plan is then evaluated against the prescription.

In the treatment delivery phase, the radiation treatment plan is executed. During this phase, the radiation dose is delivered to the patient according to the prescribed treatment plan. Generally, a treatment plan is delivered to the patient over a series of radiation treatments referred to as fractions. There are many factors, however, such as, differences in a patient's setup position, changes that might occur if a patient's tumor regresses or if the patient loses weight during therapy, and uncertainties introduced by motion, for example, that can contribute to differences between the prescribed radiation dose distribution and the actual dose delivered (i.e., the actual dose delivered to the target during the radiation treatment). These anatomical and physiological changes can cause the target volumes and surrounding anatomical structures and organs to move and change in size and shape during the therapy. As such, executing or continuing to execute the original treatment plan may result in an actual received dose distribution that differs from the planned distribution, and thus reduced doses to target volumes and/or increased doses to organs at risk (OARs). During the treatment delivery phase, therefore, the treatment plan may be adapted to the image of the day to better reflect the current situation. This involves making modifications to the original treatment plan to match the new location and shape of the target volume and surrounding anatomical structures based on subsequently acquired image data.

Adaptive radiation therapy is a process by which, using subsequent images, the initial/original treatment plan can be adjusted to counteract these anatomical changes. The adaptive radiation therapy process is a closed-loop radiation treatment process where the initial treatment plan can be modified using a systematic feedback of measurements. By systematically monitoring treatment variations and by incorporating them to re-optimize the initial treatment plan during the course of treatment, the adaptive radiation therapy improves radiation treatment.

Adaptive radiation therapy can occur at three different timescales, namely, off-line between treatment fractions, on-line immediately prior to a treatment fraction, and in real-time during a treatment fraction.

In an off-line adaptive therapy process, during each treatment fraction, a new image (CT or CTBC image, for example) of the patient is acquired before or after each of the fractions and the images are evaluated to determine multi-day locations of the target volumes. Based on this, a new treatment plan can be developed to better reflect the range of motion of the target volumes.

In an on-line (on-couch) real-time adaptive therapy process, the radiation therapy system can be used prior to a fraction to validate or adjust the treatment plan for the treatment delivery. The imaging system can thus be used to concurrently modify the treatment delivery to reflect the changes in the patient's anatomy.

In the on-couch adaptive therapy process, the radiation therapy system can also be used during a treatment fraction. On-couch adaptive radiation therapy therefore allows for the adjustment of the initial treatment plan based on tumor and anatomical changes while the patient is on the treatment table.

Generating an adapted plan during the treatment delivery phase of an adaptive treatment workflow can be time consuming and tedious. Although some of the steps involved in the plan adaptation process have been automated to assist and reduce the workload on the clinical user, it remains difficult to properly automate the optimization of the treatment plan, especially in the field of intensity modulated radiation therapy (IMRT) and volumetric-modulated arc therapy (VMAT).

Volumetric-modulated arc therapy (VMAT) refers to the technique that delivers intensity-modulated fields through rotational delivery using conventional Linacs equipped with binary multileaf collimator (MLC). In contrast to conformal arcs, the treatment field does not necessarily conform to the target volume at every angle. Instead, an effectively intensity-modulated field is delivered over an arc sector. Thus, the VMAT treatment planning aims to determine the optimal trajectories for the MLC leaves, dose rate, and gantry angle.

Optimization is an iterative process where the user attempts to specify planning goals in the form of dose or biological objectives to create an ideal dose to target structures/target volumes and minimize the dose to critical structures. Optimization algorithms generally need a starting point (input metric) that specify the kind of dose distribution preferred. Generally, the starting point is either a set or a template of clinical goals (CG) to specify the preferred dose distribution (e.g., how much dose is needed for the target structure/target volume and what is the upper limit dose in an organ at risk), or a knowledge-based model that guides the optimization process (e.g., model estimates the achievable dose distributions per structure).

Current volumetric-modulated arc therapy (VMAT) plan optimization algorithms, however, tend to be unstable to small variations in the input data. As such, the daily treatment plan can differ globally from the initial treatment plan. This effect is even larger in the case where the optimization process is based on satisfying prioritized clinical goals.

There have been attempts to solve this problem by using the MLC leaf positions from a preliminary plan determined for a planning image taken before the actual daily treatment session image. However, this approach has shortcomings. If the deformation between the planning image and the daily treatment session image is too large, the MLC leaf sequences obtained in the preliminary planning could already be in the basin of certain non-acceptable local minimum, in which case, the VMAT optimization algorithm would not be able to find a better solution (i.e., better treatment plan) since the scanning of the solution space is limited.

Another attempt to solve this problem is by deforming the MLC leaf sequences of the preliminary plan based on the deformation field between the planning and the daily treatment session images. However, performing such a deformation is not well defined since it is not guaranteed that the deformation of the MLC leaf positions leads to a good treatment plan. Some target coverage may be improved, but there is a possibility that critical organ doses are not well controlled.

In order to speed up the optimization process in the on-couch adaptive therapy, the currently used treatment adaptation function accomplishes the optimization by starting from a standard/generic initial condition, instead of employing previously generated treatment plans as a starting point.

There is thus a need for a system and method to automatically optimize an adapted treatment plan in an adaptive workflow that solves these deficiencies in the optimization process.

SUMMARY

Systems and methods are described herein that are configured to use similarity metrics to determine optimization strategies in adaptive radiation therapy.

Systems and methods are further described herein that enable an automated process for an adaptive radiation therapy session to generate and optimize a treatment plan using optimization algorithms that include optimization parameters generated based on control points automatically selected based on the similarity metrics.

Systems and method are further disclosed that enable to obtain a set of directives including plan quality values of a preliminary treatment plan for a planning patient model; generate a treatment session patient model using information from the set of directives; determine a similarity metric between target structures of the planning patient model and corresponding target structures of the treatment session patient model; and generate an adapted treatment plan for the treatment session patient model by: using the preliminary treatment plan as input to a treatment plan generation algorithm to generate a current plan; the treatment plan generation algorithm including optimization parameters generated based on control points automatically selected based on the determined similarity metric; and generating the adapted treatment plan by optimizing the current plan based on the plan quality values of the preliminary treatment plan.

Systems and methods are further disclosed that enable for a method for adapting a preliminary radiation treatment plan for a current treatment session of an adaptive radiation therapy session, comprising: obtaining a set of directives including plan quality values of a preliminary treatment plan for the patient; using the set of directives to perform a series of automated steps to generate a current treatment session patient model; determine a similarity metric between target structures of the current treatment session patient model and corresponding target structures of a plurality of previously obtained treatment session patient models; determine the previously obtained treatment session patient model that has the highest similarity metric value; and generate an adapted treatment plan for the current treatment session patient model by: using the preliminary treatment plan as input to a treatment plan generation algorithm to generate a current plan, the treatment plan generation algorithm including optimization parameters generated based on control points automatically selected based on the determined similarity metrics; and generating the adapted treatment plan by optimizing the current plan based on the plan quality values of the preliminary treatment plan, wherein the control points include MLC leaf configurations, and wherein a standard MLC leaf configuration is selected when the highest similarity metric value is below a predetermined threshold, and an MLC leaf configuration of a treatment plan of the previous treatment session patient model having the highest similarity metric value is selected when the highest similarity metric value is above the predetermined threshold.

Systems and methods are further disclosed for implementing an automated workflow for an adaptive radiation therapy session of a patient, comprising: a computer processing system configured to: obtain a set of directives including plan quality values of a preliminary treatment plan for the patient; and using the set of directives, perform a series of automated steps to: generate a current treatment session patient model; and generate an adapted treatment plan for the treatment session patient model by: using the preliminary treatment plan as input to a treatment plan generation algorithm to generate a current plan, optimizing the current plan based on optimization parameters generated based on control points selected based on a similarity metrics determined between target structures of the current treatment session patient model and corresponding target structures of either a planned patient model or one or more previously obtained treatment session patient models, wherein the control points include MLC leaf configurations, and wherein a standard MLC leaf configuration is selected when the highest similarity metric value is below a predetermined threshold, and an MLC leaf configuration of a treatment plan of the previous treatment session patient model having the highest similarity metric value is selected when the highest similarity metric value is above the predetermined threshold.

Systems including a computer processing device configured to execute a sequence of programmed instructions embodied on a computer-readable storage medium, the execution thereof causing the system to execute the method steps disclosed herein, are also disclosed.

A non-transitory computer-readable storage medium upon which is embodied a sequence of programmed instructions for the generation of day-to-day treatment images to be used in adaptive radiation therapy, and a computer processing system that executes the sequence of programmed instructions embodied on the computer-readable storage medium are also disclosed. Execution of the sequence of programmed instructions can cause the computer processing system to execute the automatic treatment planning and optimization processes described herein.

Objects and advantages of embodiments of the disclosed subject matter will become apparent from the following description when considered in conjunction with the accompanying drawings.

DETAILED DESCRIPTION

Figure 1A:
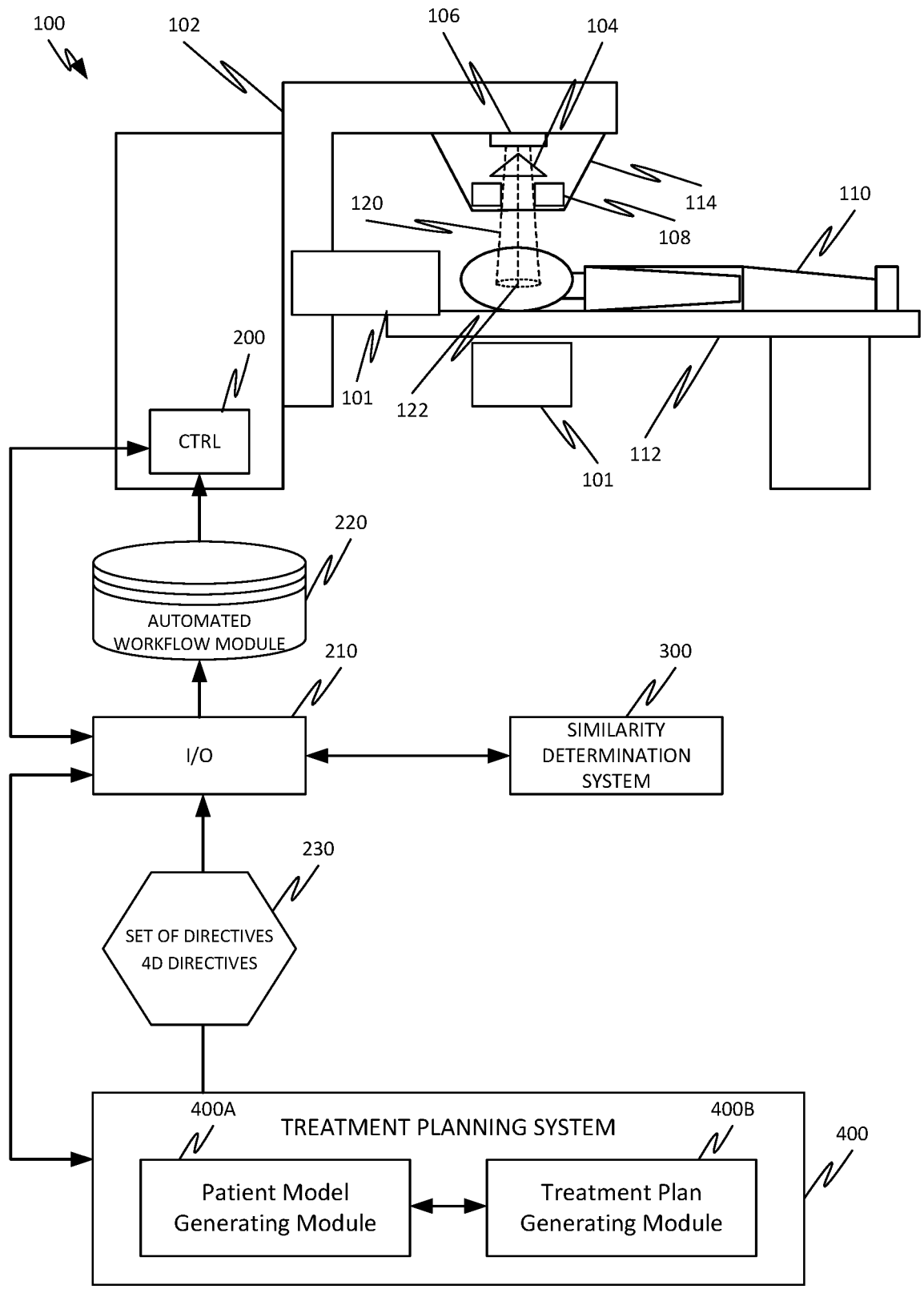
FIGS. 1A-1B are simplified schematic diagrams of a radiation therapy system, according to various embodiments of the disclosed subject matter.
Figure 1B:
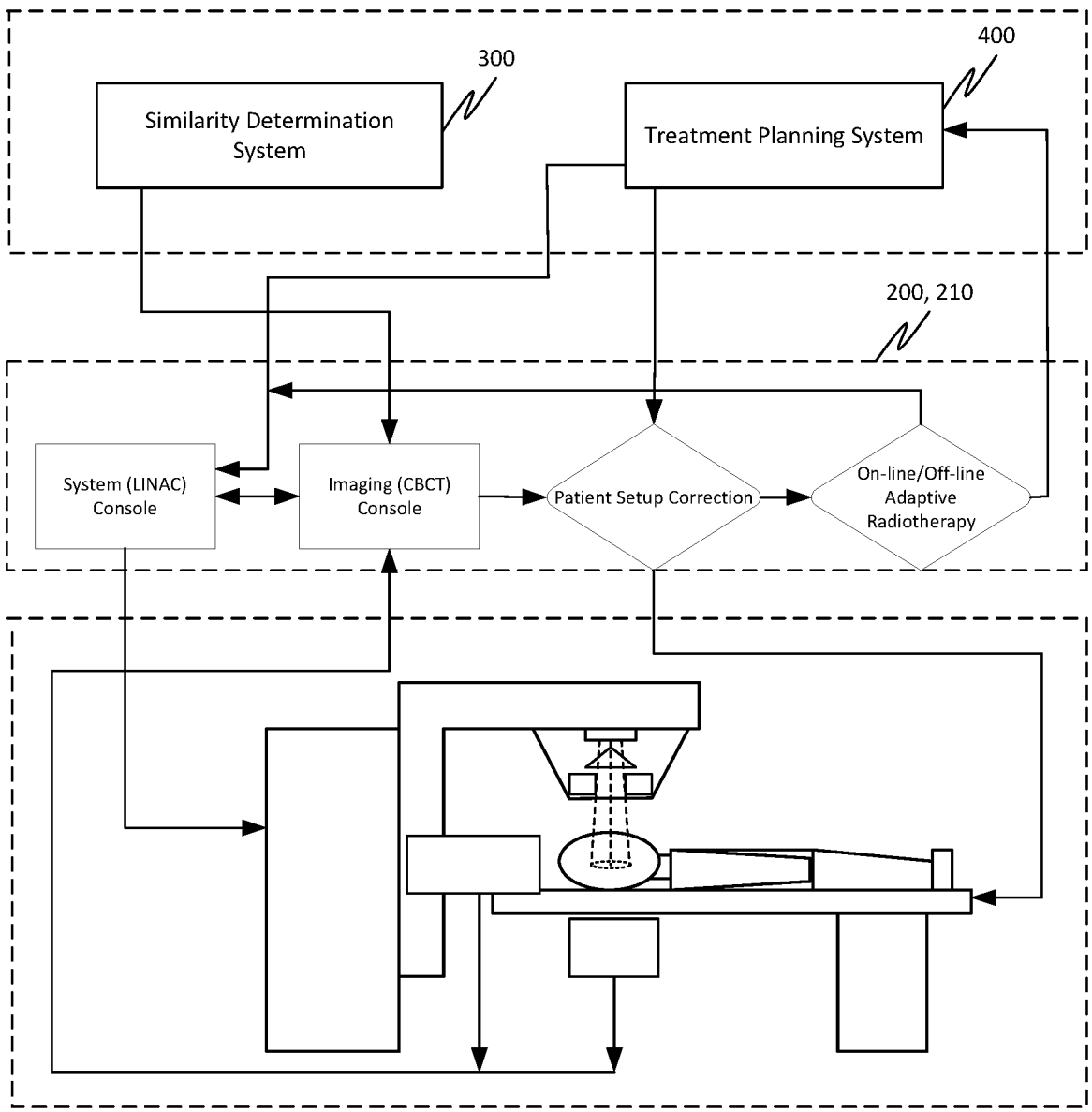
Figure 2:
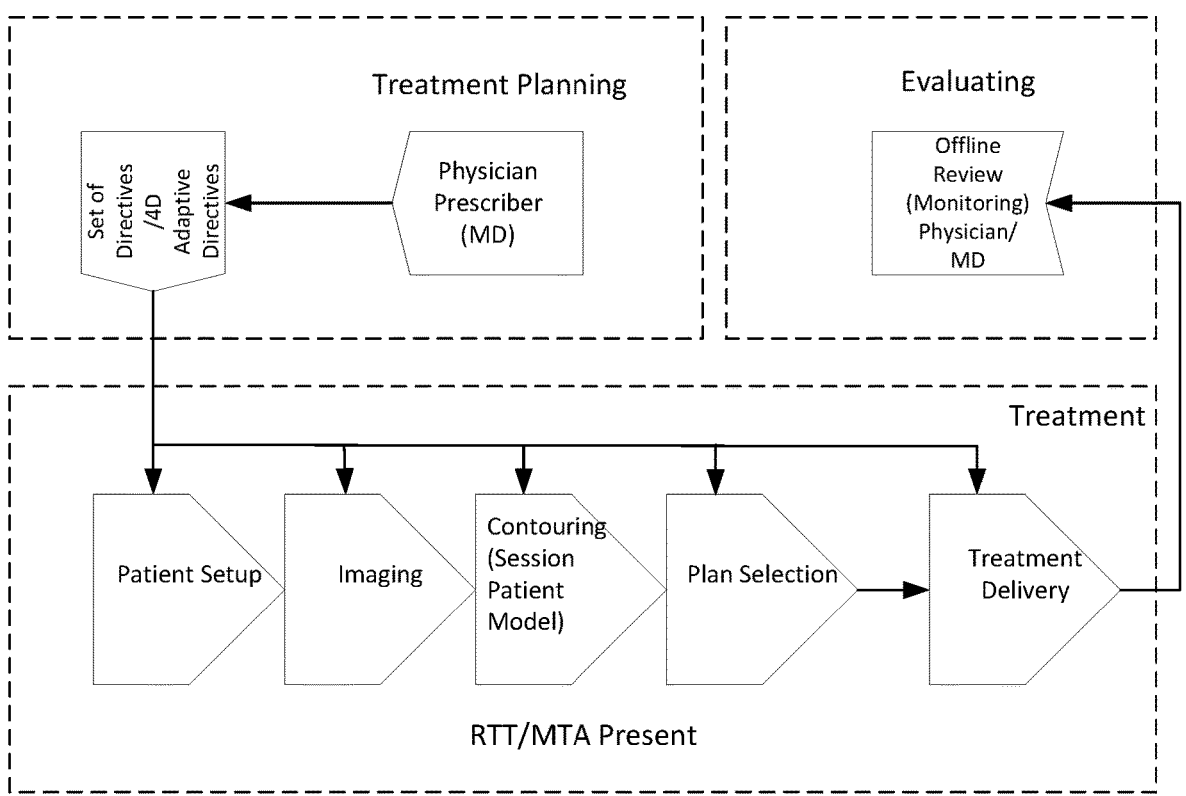
FIG. 2 is a simplified illustration for using the radiation therapy system of FIG. 1 for on-couch adaptive radiation therapy, according to various embodiments of the disclosed subject matter.

Referring to FIGS. 1A and 1B, an exemplary radiation therapy system 100 is shown that can be used in adaptive radiation therapy as shown in FIG. 2, and which can deliver radiation in accordance with treatment plans that are determined using techniques described herein. The radiation therapy system 100 can provide radiation to a patient 110 positioned on a treatment couch 112 and can allow for the implementation of various radiation dose verification protocols. The radiation therapy can include photon-based radiation therapy, particle therapy, electron beam therapy, or any other type of treatment therapy.

In an embodiment, the radiation therapy system 100 can include a radiation treatment device 101 such as, but not limited to, a LINAC operable to generate one or more beams of megavolt (MV) X-ray radiation for treatment. The LINAC may also be operable to generate one or more beams of kilovolt (kV) X-ray radiation, for example, for patient imaging. The system 100 has a gantry 102 supporting a radiation treatment head 114 with one or more radiation sources 106 and various beam modulation elements, such as, but not limited to, flattening filter 104 and collimating components 108. The collimating components 108 can include, for example, a multi-leaf collimator (MLC), upper and lower jaws, and/or other collimating elements. The collimating components 108 and/or the flattening filter 104 can be positioned within the radiation beam path by respective actuators (not shown), which can be controlled by controller 200.

The gantry 102 can be a ring gantry (i.e., it extends through a full 360° arc to create a complete ring or circle), but other types of mounting arrangements may also be employed. For example, a static beam, or a C-type, partial ring gantry, or robotic arm can be used. Any other framework capable of positioning the treatment head 114 at various rotational and/or axial positions relative to the patient 110 may also be used.

In an embodiment, the radiation therapy device is a MV energy intensity modulated radiation therapy (IMRT) device. The intensity profiles in such a system are tailored to the treatment requirements of the individual patient. The IMRT fields are delivered with MLC 108, which can be a computer-controlled mechanical beam shaping device attached to the head 114 and includes an assembly of metal fingers or leaves. For each beam direction, the optimized intensity profile is realized by sequential delivery of various subfields with optimized shapes and weights. From one subfield to the next, the leaves may move with the radiation beam on (i.e., dynamic multi-leaf collimation (DMLC)) or with the radiation beam off (i.e., segmented multi-leaf collimation (SMLC)).

Alternatively, or additionally, the radiation therapy device 101 can be a tomotherapy device, a helical tomotherapy device, or a simplified intensity modulated arc therapy (SIMAT) device, a volumetric-modulated arc therapy (VMAT) device, or a volumetric high-definition (or hyper-arc) therapy (HDRT) device. In effect, any type of IMRT device can be employed as the radiation therapy device 101 of system 100, and can also include an on-board volumetric imaging, which can be used to generate in-treatment image data generated during a treatment session.

For example, embodiments of the disclosed subject matter can be applied to image-guided radiation therapy (IGRT) devices, which uses cross-sectional images of a patient's internal anatomy taken during the radiation therapy treatment session (i.e., in-treatment images) to provide information about the patient's position. Frequent two or three-dimensional imaging during the radiation treatment is used to direct the therapeutic radiation utilizing the imaging coordinates of the actual radiation treatment plan. This ensures that the patient is localized in the radiation treatment system in the same position as planned, and that the patient is properly aligned during the treatment. Although, the IGRT process involves conformal radiation treatment guided by specialized imaging tests taken during the planning phase, it does rely on the imaging modalities from the planning process as the reference coordinates for localizing the patient 110 during treatment. Thus, associated with each image-guided radiation therapy system is an imaging system to provide in-treatment (treatment session) images that are used to set-up the radiation delivery procedure.

In-treatment images can include one or more two or three-dimensional images (typically X-ray) acquired at one or more different points during treatment. There are a variety of ways to acquire in-treatment images. In certain approaches, distinct independent imaging systems and/or imaging methods are used for acquiring pre-treatment and in-treatment images, respectively. For example, a 3D IGRT could include localization of a cone-beam computed tomography (CBCT) dataset with a planning computed tomography (CT) dataset, and a 2D IGRT could include matching planar kilovoltage (kV) radiographs or megavoltage (MV) images with digital reconstructed radiographs (DRRs) obtained from the planning CT.

Each type of radiation therapy device can be accompanied by a corresponding radiation plan and radiation delivery procedure.

The controller 200, which can be, but is not limited to, a graphics processing unit (GPU), can include a computer with appropriate hardware such as a processor, and an operating system for running various software programs and/or communication applications. The controller 200 can include software programs that operate to communicate with the radiation therapy device 101, which software programs are operable to receive data from external software programs and hardware. The computer can also include any suitable input/output (I/O) devices 210, which can be adapted to allow communication between controller 200 and a user of the radiation therapy system 100, e.g., medical personnel. For example, the controller 200 can be provided with I/O interfaces, consoles, storage devices, memory, keyboard, mouse, monitor, printers, scanner, as well as a departmental information system (DIS) such as a communication and management interface (DICOM) for storing and transmitting medical imaging information and related data and enabling the integration of medical imaging devices such as scanners, servers, workstations, printers, network hardware, etc.

Alternatively, or additionally, the I/O devices 210 can provide access to a network (not shown) for transmitting data between controller 200 and remote systems. For example, the controller 200 can be networked via I/O 210 with other computers and radiation therapy systems. The radiation therapy system 100, the radiation treatment device 101, and the controller 200 can communicate with a network as well as databases and servers, for example, a dose calculation server (e.g., distributed dose calculation framework), a similarity determination system 300, and a treatment planning system 400. The controller 200 may also be configured to transfer medical image related data between different pieces of medical equipment.

The system 100 can also include a plurality of modules containing programmed instructions (e.g., as part of controller 200, or as separate modules within system 100, or integrated into other components of system 100), which instructions cause system 100 to perform different functions related to adaptive radiation therapy or other radiation treatment, as discussed herein, when executed. For example, the system 100 can include a treatment plan module operable to generate the treatment plan for the patient 110 based on a plurality of data input to the system by the medical personnel, a patient positioning module operable to position and align the patient 110 with respect to a desired location, such as the isocenter of the gantry, for a particular radiation therapy treatment, an image acquiring module operable to instruct the radiation therapy system and/or the imaging device to acquire images of the patient 110 prior to the radiation therapy treatment (i.e., pre-treatment/reference/planning images used for treatment planning and patient positioning) and/or during the radiation therapy treatment (i.e., in-treatment/daily treatment session images), and to instruct the radiation therapy system 100 and/or the imaging device 101 or other imaging devices or systems to acquire images of the patient 110.

The system 100 can further include a radiation dose prediction module operable to predict a dose to be delivered to the patient 110 before commencement of the radiation treatment therapy, a dose calculation module operable to calculate the actual dose delivered to the patient 110 during radiation therapy treatment, a treatment delivery module operable to instruct the radiation therapy device 100 to deliver the treatment plan to the patient 110, a correlation module operable to correlate the planning images with the in-treatment/daily treatment session images obtained during radiation therapy, a computation module operable to reconstruct three-dimensional target volumes from in-treatment images, an analysis module operable to compute displacement measurements, and a feedback module operable to instruct the controller in real-time to stop radiation therapy based on a comparison of the calculated displacement with a predetermined threshold value (range).

The system 100 can further include one or more contour generation modules operable to generate contours of target volumes and other structures in pre-treatment (planning, reference) and in-treatment (treatment session) images, an image registration module operable to register pre-treatment images with subsequent in-treatment images, a dose calculation module operable to calculate accumulated dose, a contour propagation module operable to propagate a contour from one image to another, a contour verification module operable to verify a generated contour, a registration deformation vector field generation module operable to determine deformation vector fields (DVFs) as a result of an image deformation process, a similarity metric determination/calculation module operable to determine/calculate a similarity metric between the target structures of the planning images and the target structures of the in-treatment/daily treatment session images, or between the target structures of the planning image(s) and each of the daily treatment session images, and a comparing module operable to compare the similarity metric values to a predetermined threshold value. The system 100 can further include modules for electron density map generation, isodose distribution generation, does volume histogram (DVH) generation, image synchronization, image display, treatment plan generation, treatment plan optimization, automatic optimization parameter generation, updating and selection, and adaptive directives and treatment information transfer. The modules can be written in the C or C++ programming language, for example. Computer program code for carrying out operations as described herein may be written in any programming language, for example, C or C++ programming language.

Figure 3:
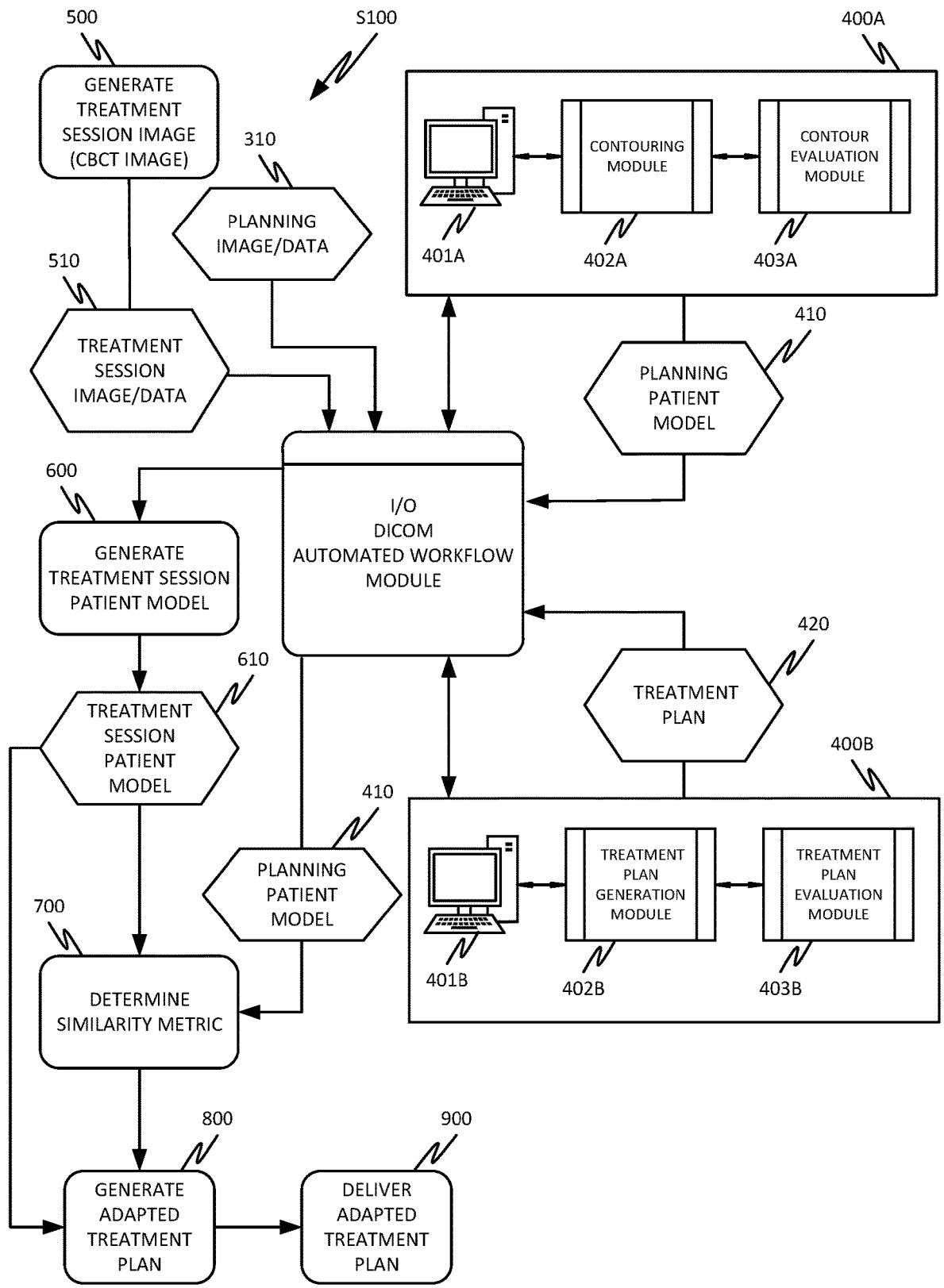
FIG. 3 is a workflow diagram for use in on-couch adaptive radiation therapy, according to various embodiments of the disclosed subject matter.

FIG. 3 illustrates an automated workflow S100, implemented via module 220 of the system 100, to include an organ similarity metric as an input into an automated optimization process in an on-couch adaptive radiation treatment protocol (shown in FIG. 2).

The automated adaptive workflow S100 initiates the generation of a treatment plan for the system 100 via the treatment planning system 400. The treatment planning system 400 can be a distinct separate treatment planning system or can be configured to be part of the system 100 as a treatment planning module. The treatment planning system 400 can be used to generate one or more treatment plans (preliminary/initial treatment plan, as well as one or more treatment plans adapted for the current/daily situations) based on image data, such as a CT or CBCT image data previously taken and saved in a storing device or generated before or during a treatment session by system 100.

The treatment planning system 400 includes a patient model generating module 400A for generating a planning patient model 410/410', and a treatment plan generating module 400B for generating an initial/preliminary treatment plan 420 for the planning patient model 410/410'.

In a typical planning process, qualified medical personnel (physician) manually draws contours on one or more of the initial planning images, such as a CT image 310. These contours delineate the malignant tumor that is to be irradiated, as well as one or more other structures, such as organs, tissue, etc. that are susceptible to substantial damage from radiation exposure. The planning images can also be semi-automatically or automatically segmented to delineate the malignant tumor that is to be the target of the irradiation, and any surrounding critical structures (OARs) whose irradiation should be limited. Typical delineations for the malignant tumor include the gross target volume (GTV), the clinical target volume (CTV), and the planning target volume (PTV). The (GTV) determines the anatomic region which harbors the highest tumor cell density and requires the highest prescribed dose. The (GTV) is the position and extent of the gross tumor, i.e., what can be seen, palpated or imaged. The (CTV) contains the (GTV), plus a margin for sub-clinical disease spread which therefore cannot be fully imaged. The (CTV) is the volume that must be adequately treated to achieve cure. The (PTV) allows for uncertainties in planning or treatment delivery. It is a geometric concept designed to ensure that the radiotherapy dose is actually delivered to the (CTV). The (PTV) is thus used to compensate for treatment setup uncertainties through volumetric expansion of the (CTV) margins. The planning images can also illustrate soft tissues, influencer structures, organs, blood vessels, bones, etc.

One or more anatomical structures of interest (body outlines, for example), as well as one or more influencer structures (contours of organs and/or non-volumetric structures that influence one or more of a shape, size, and location of one or more of the target structures) can also be generated on the planning CT image 310.

Influencers are structures that influence one or more of the shape, size, and location of one or more of the primary target, the nodal target, the primary organ, and the other anatomical structures of interest during online adaptation. These influencers can include structures, such as organs, that generally move and/or exhibit large deformations and/or movements from day to day, as well as other non-volumetric structures, such as points or 2D lines, for example, which describe an anatomical situation.

Figure 4:
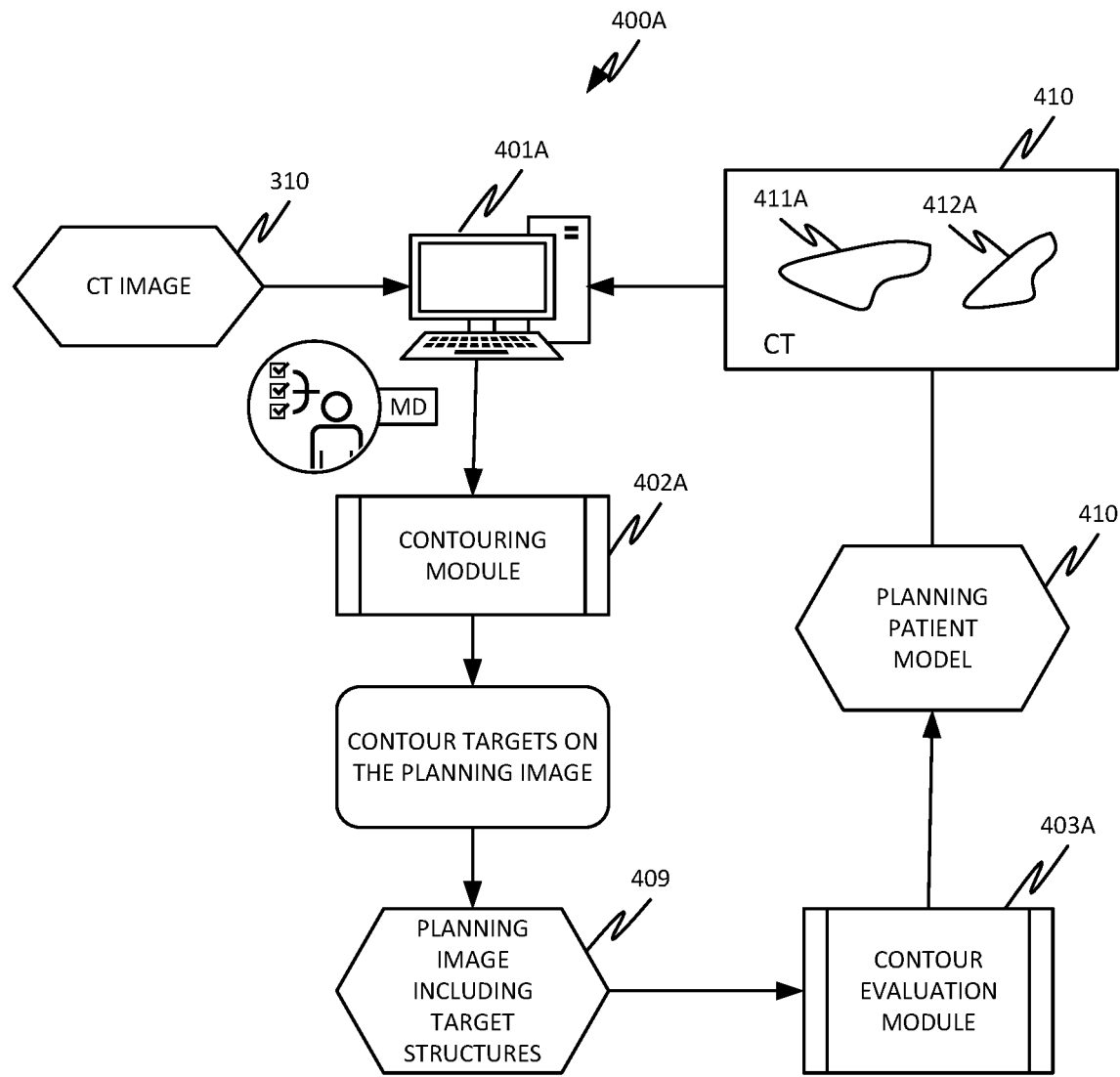
FIGS. 4-5 are process flow diagrams for generating planning patient models, according to various embodiments of the disclosed subject matter.
Figure 5:
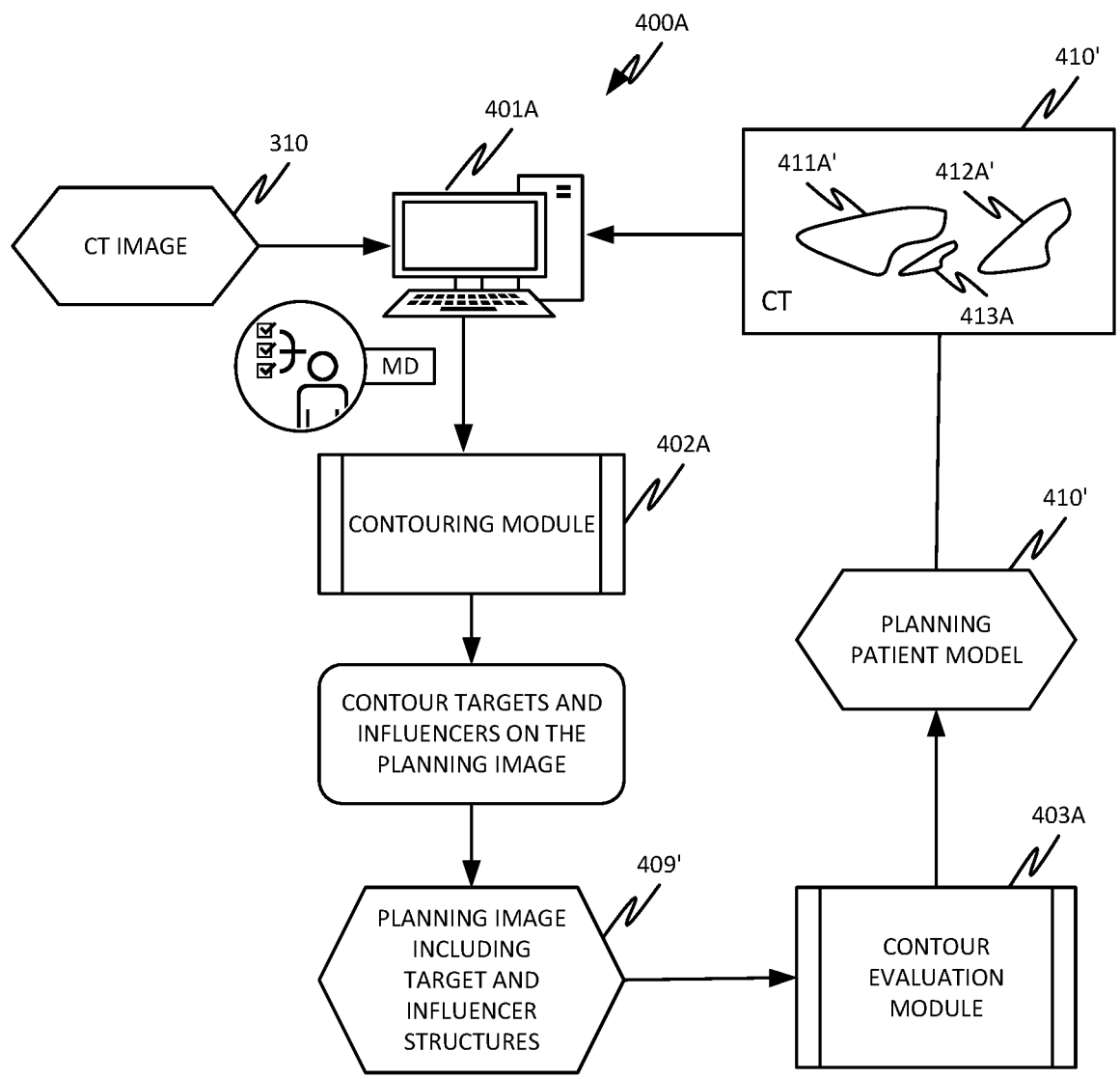
Figure 6:
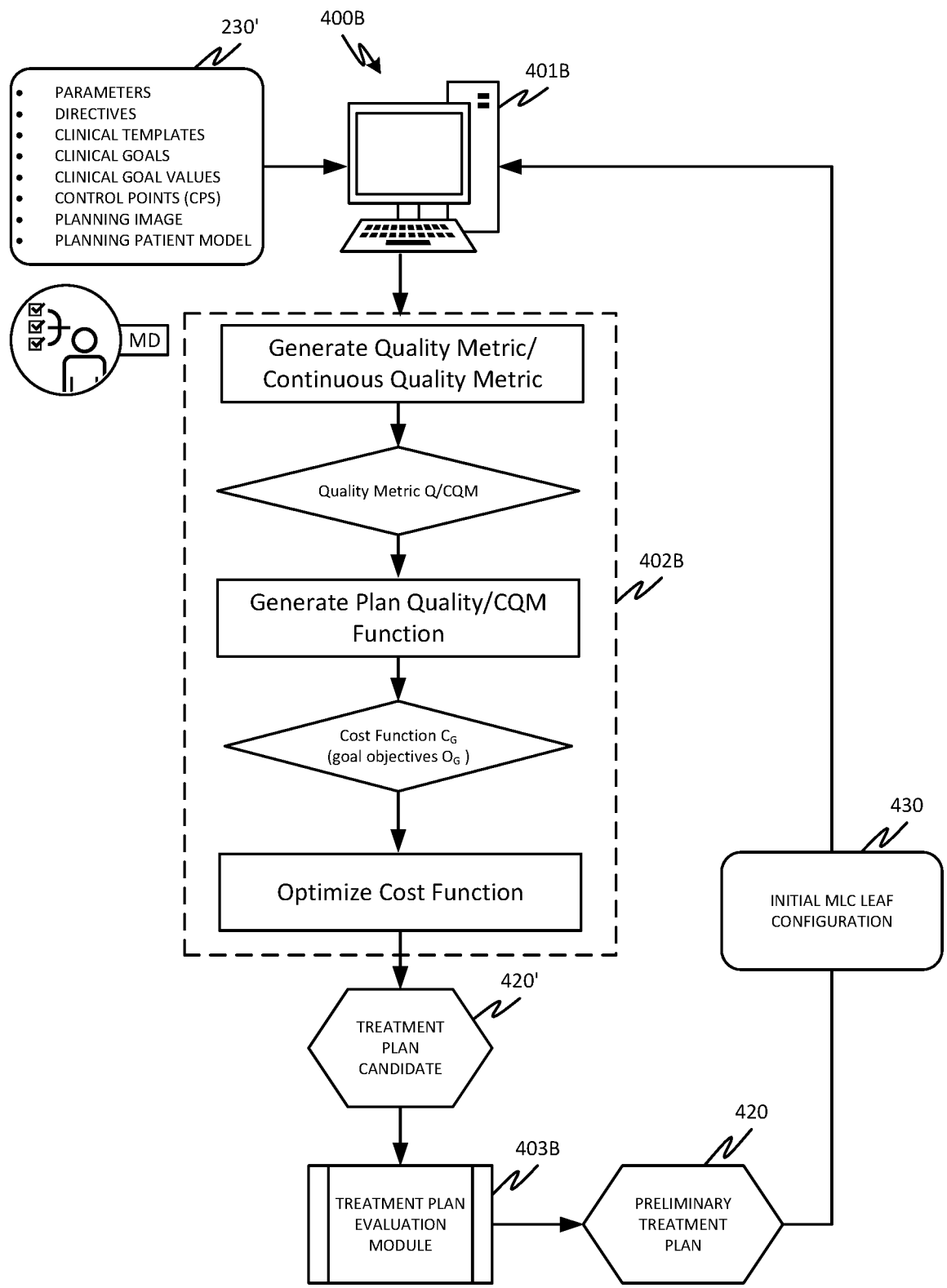
FIG. 6 is a process flow diagram for generating a preliminary treatment plan, according to various embodiments of the disclosed subject matter.

As illustrated in FIG. 4, the contouring module 402A contours/delineates targets (organs to be irradiated and organs to be spared, for example) on the planning CT image 310 to obtain a planning CT image 310 including target structures 409. As illustrated in FIG. 5, a planning patient module 410' may also include influencer structures 413A obtained by contouring not only the targets to be irradiated 411A' and targets to be spared 412A' by the contouring module 402A but also one or more influencers.

The target structures and influencer structures delineated on the planning CT image 310 can be evaluated on computer display 401A by a qualified medical personnel (physician) using contour evaluation module 403A. If accepted, the planning CT image 310 including the target structures/influencer structures/anatomical structures of interest becomes the patient model 410/410'.

The planning patient model 410/410', the planning image (i.e., CT image 310), the target structures on the planning image (i.e., planning target structures 411/411',412/412'), as well as information regarding the planning CT image 310 and the shapes and locations of the planning target structures in the planning CT image 310, and information regarding the influencers 413, and any other delineated anatomical structures are sent to the system 100 via the I/O 200, the DICOM, or the imaging console, or are made available to the system 100 via the I/O 200, the DICOM, or the imaging console.

To generate a treatment plan, the medical personnel (physician) generates a list of treatment parameters 230', such as but not limited to, the targets for which the radiation is to be maximized, targets for which the radiation is to be minimized, and other parameters and directives related to the specific system 100 and imaging device 101 that will deliver the treatment plan to the patient 110. The physician also specifies a preferred dose distribution for the target structures. The dose distribution is expressed as a set or a template of clinical goals (CG), which are suitable goals of radiation doses for the treatment of the patient. These clinical goals (CG) can be given for example in the form of mean dose of radiation (in Gray) to a target structure and the dose that certain volume of an organ, such as an organ at risk (OAR), must not exceed. Clinical goals, however, may also be given in other dimensions that are not in the form of dose of radiation to a target structure and dose to volume of organ. Each of the given goals can further be ordered in priority describing the importance of meeting a goal in comparison to another goal. Such a set is referred to as a prioritized set of clinical goals (prioritized CG). Each clinical goal can be expressed as a quality metric Q and its associated goal value. An exemplary prioritized set of clinical goals is:

GOAL 1: Target (PTV) must receive 50Gy: Priority 1
GOAL 2: Organ at risk X (OARx) must receive less than 25 Gy: Priority 2
GOAL 3: Organ at risk Y (OARy) must receive a mean dose of less than 30 Gy: Priority 3

The treatment plan generating module 400B then automatically generates an optimized plan for the planning patient module 410/410' (i.e., the preliminary plan 420) by minimizing, via an optimization process, a cost function (CG) defining the dose distribution for the set of prioritized clinical goals (CG). There are many algorithms that can be applied to minimize a cost function, including but not limited to, calculating the gradient of the cost function. The solution to the optimization process results in treatment parameters being determined for the treatment plan candidate 420'.

For VMAT planning, at the outset of the treatment planning process, a number of control points (CPs) are also specified for the beam trajectory that takes into consideration the beam shaping elements of the system 100. Each control point (CP) is associated with a set of treatment parameters, including but not limited to, a set of MLC leaf positions, MLC shape, gantry rotation speed, gantry position, dose rate, the cumulative number of monitor unit (MU) that is delivered to a control point, and/or any other parameters, such as, maximum MLC leaf speed, minimum leaf gap for moving the MLC leaves or interdigitation constraints, maximum leaf travel per degree of gantry rotation, etc.

The number and positions of the control points (CPs) may be set in any convenient manner, such as, but not limited to, by using the treatment planning software, or by the system operator. In an exemplary embodiment, the beam trajectory can include a single 180 degrees arc trajectory and approximately 177 sequential control points (CPs), which means that there are 177 configurations that the LINAC should conform to in order to deliver the planned treatment. Based on the treatment parameters, a dose distribution within the treatment volume can be calculated for each control point (CP) by any number of techniques, such as, but not limited to, pencil beam convolution, or any other suitable algorithm, and the radiation dose distribution for each (CP) can be associated with the corresponding gantry angle, MLC configuration, and monitor unit (MU). As such, during treatment delivery, the extracted (CP) parameters can be associated with corresponding calculated dose distributions for each control point (CP). The treatment plan candidate 420' for VMAT planning therefore determines the optimal trajectories for the MLC leaves, dose rate and gantry angles, that fulfill the prioritized set of clinical goals.

The physician can also evaluate the treatment plan candidate 420' at 403B. The accepted treatment plan candidate becomes the preliminary treatment plan 420. The preliminary treatment plan 420 and associated parameters (i.e., initial MLC leaf configuration 430, clinical goals, dose specification, clinical goal values, treatment plan 3D dose, how the plan was optimized, control points, etc.) are stored in a storage device of the treatment planning system 400, to be later retrieved by the system 100 for operating the system 100 to deliver radiation treatment according to a selected radiation treatment plan.

The physician also develops a set of adaptive directives 230, which is a list of parameters/directives/information that describes the intent of the adaptive treatment, namely, the 4D description of the planned treatment for the patient 110. The set of adaptive directives can include information regarding the planned dose specification (i.e., Rx prescription), whether adaptive or standard IGRT therapy is to be used, the prescribed clinical goals, such as but not limited to, the target dose coverage and (OAR) risk dose limits, planned clinical goal values, the planning image 310, supporting images with their corresponding registration information (PET, MRI, etc.), the planned patient model 410/410' (i.e., the contours of the planned structures, such as the target volumes, OARs and other internal dose derived structures on the planned image), the preliminary treatment plan 420, the initial MLC leaf configuration 430 associated with the preliminary treatment plan 420, preliminary treatment plan 3D dose (i.e., RT 3D dose), a list of the target structures (target volumes, OARs, influencer structures, body outlines) of the planned CT image 310, a list of influencer structures of different treatment sites, information regarding the shapes and location of the planned structures on the planned image, as well as any information as to how the preliminary treatment plan was optimized.

The intent of the adaptive radiotherapy is to appropriately modify the radiation treatment plan (i.e., the preliminary treatment plan 420) to account for the temporal changes in the anatomy of the patient. As such, images, such as daily CBCT images for example, obtained (500) during a treatment session (i.e., treatment session image 510) at the treatment site are sent to the treatment planning system 400 where the preliminary treatment plan 420 can be adapted to the current anatomy via deformable registration software and sent back to the system 100 for delivery.

In order to adapt the preliminary treatment plan 420, first an accurate treatment session patient model 610 (i.e., contours of the targets on the current anatomy) needs to be generated, then the preliminary treatment plan 420 properly modified to fit the new anatomy, and quickly evaluated for application on the patient 110. The on-couch adaptive workflow 220 generates the treatment session patient model 610 in a step-wise fashion through a series of automated steps guided by the set of adaptive directives 230. The set of directives 230 are also used to guide the generation (800), selection, and delivery (900) of a treatment plan that is most appropriate for the current anatomy of the patient.

Figure 7:
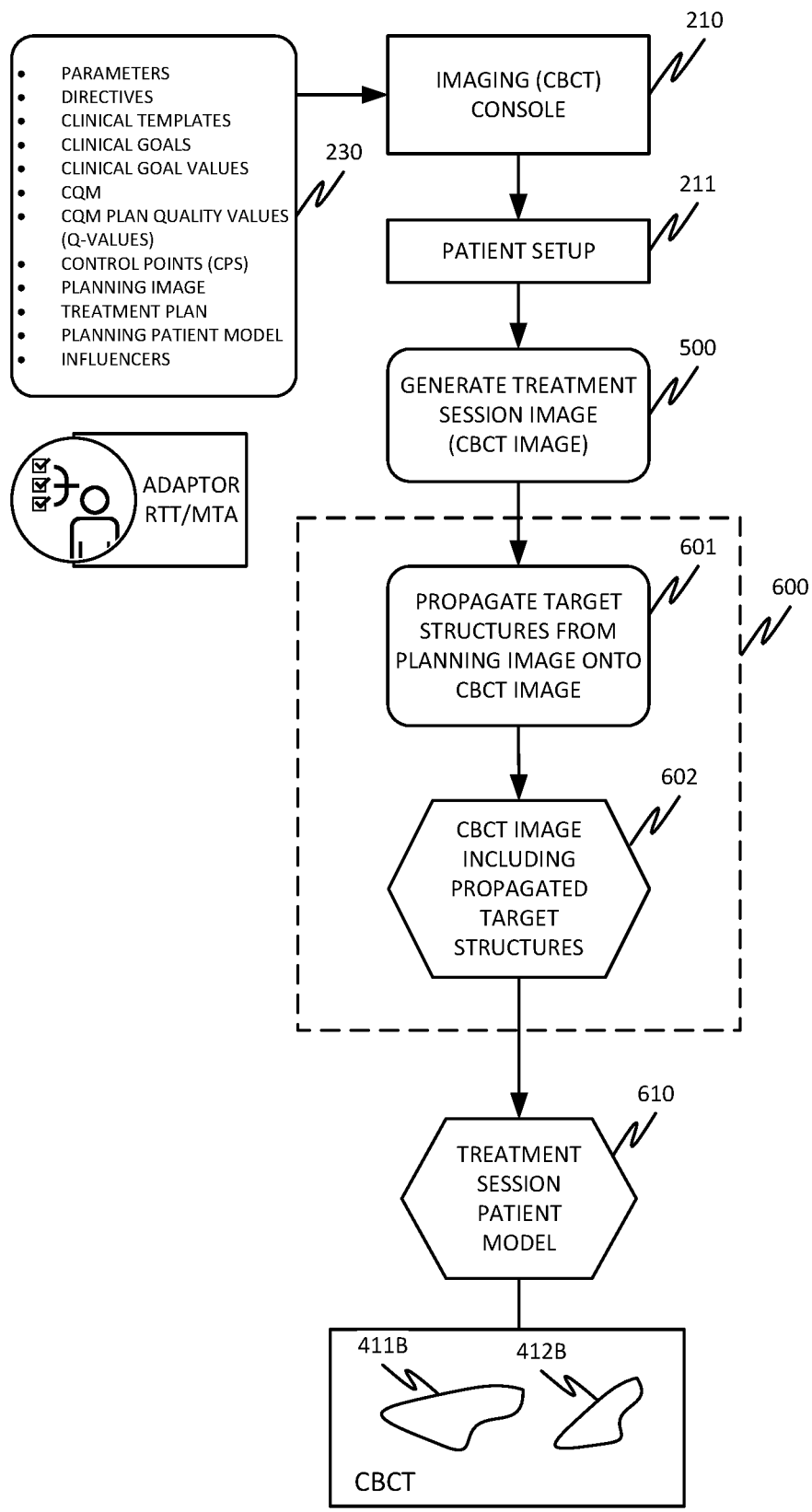
FIGS. 7-10 are process flow diagrams for generating treatment session patient models, according to various embodiments of the disclosed subject matter.

As shown in FIGS. 2 and 7, a radiation technologist (RTT/MTA) who is skilled and trained at reviewing anatomy and plan selection, and who is tasked to deliver the adaptive treatment on the patient (i.e., the user/adapter), executes the first level of treatment modification, which is setting the patient (211) on the treatment couch and moving the patient to the imaging position (see FIG. 2).

After the patient setup (211), one or more treatment session images (510) of the portion of the patient 110 that is of interest are taken (500) using the radiation imaging device 101. In an exemplary embodiment, the treatment session image is a 3D or 4D CBCT scan for example obtained during a treatment session by irradiating the region of interest of the patient 110 with radiation 120. This treatment session image 510 may show boney structures of the patient 110 but does not include any delineations of target volumes or other structures.

Figure 8:
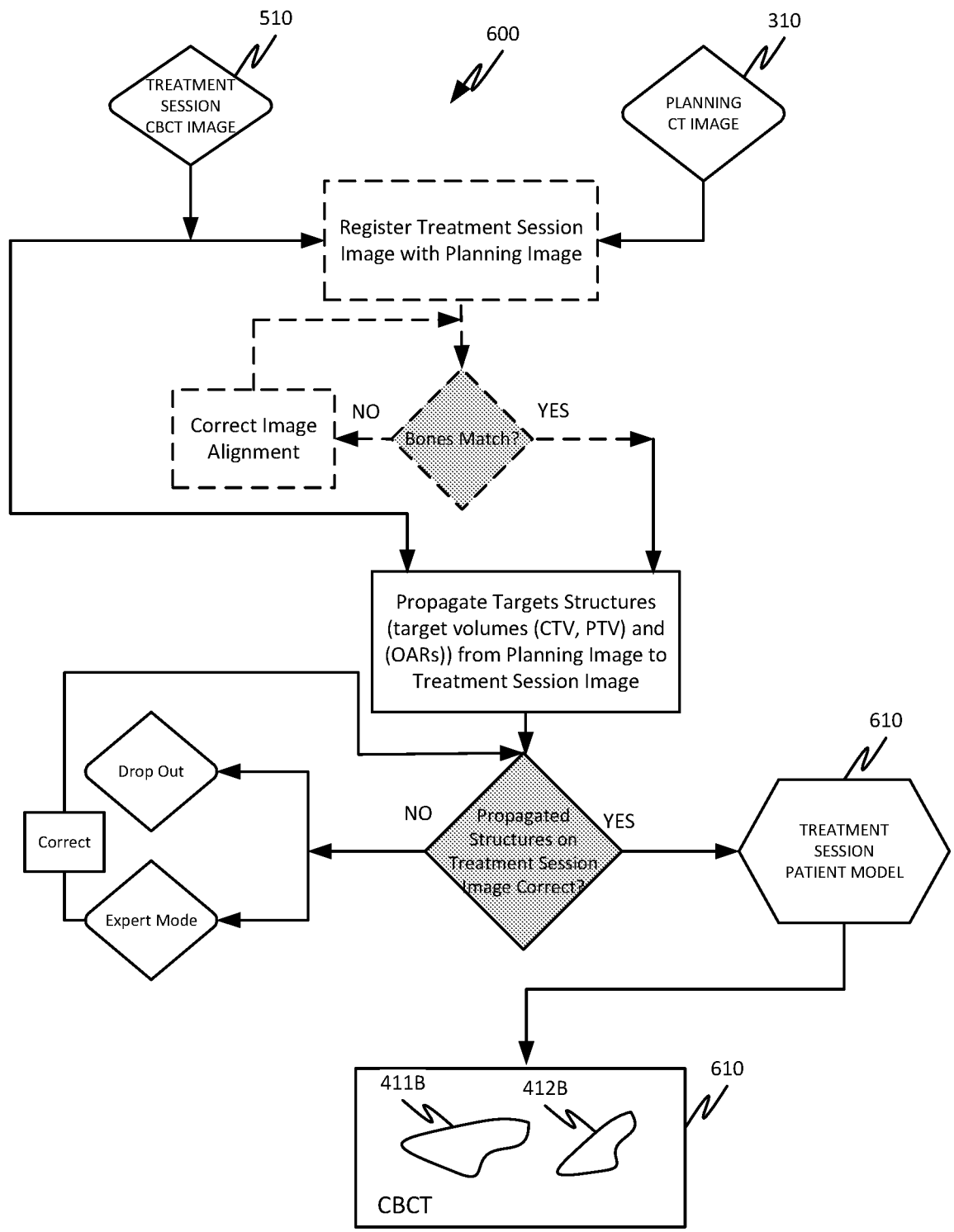

Then, the RTT/MTA initializes (600), via the contouring module 403A, the generation of contours of the planning structures (411A, 412A) on the treatment session image 510 to obtain a treatment session patient model 610 (i.e., treatment session CBCT image 510 including the target structures of the planning patient session 410). This can be done by propagating (601) the planning target structures (411A, 412A) from the planning patient model 410 onto the treatment session image 510 to obtain (602) a treatment session CBCT image 510 containing the propagated target structures (411B, 412B). The RTT/MTA can evaluate the so obtained treatment session image, and if accepted, this image and associated image data becomes the treatment session patient model 610, as shown in FIGS. 7-8.

Figure 9:
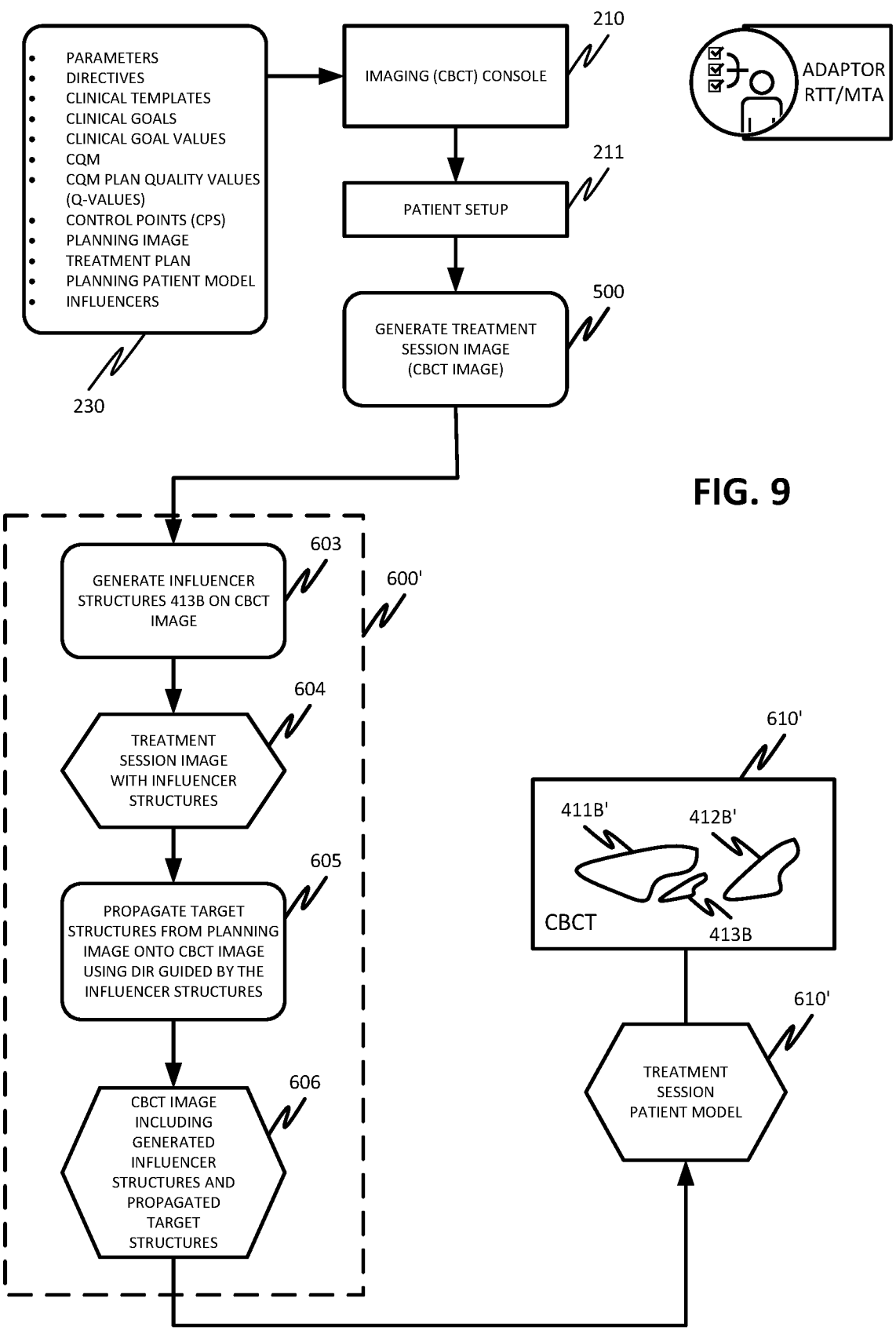
Figure 10:
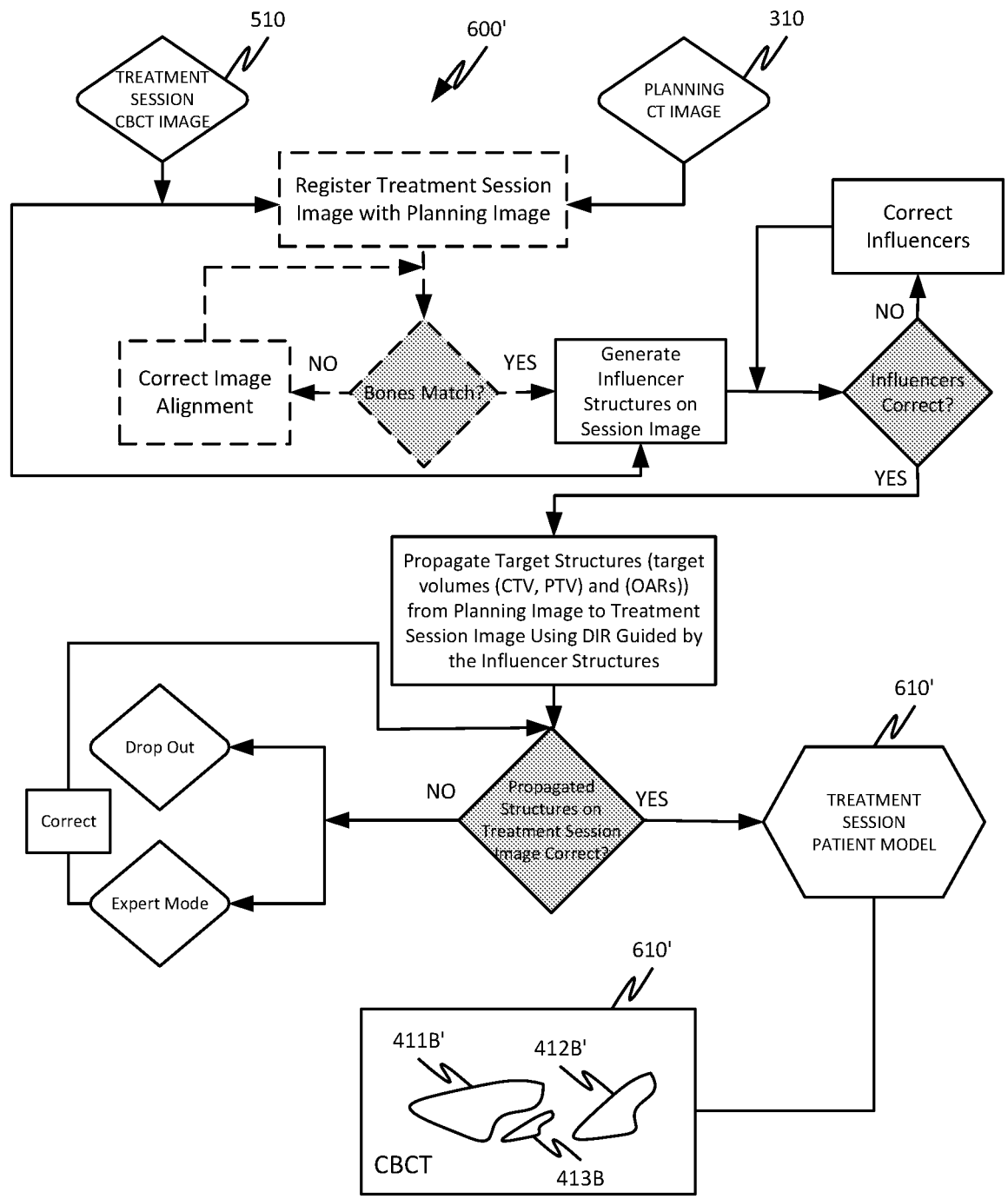

Alternatively, the RTT/MTA initializes (603) the delineating of influencers that are included in the set of adaptive directives 230 on the treatment session image 510 to obtain a treatment session CBCT image 510 including influencer structures (604), then the RTT/MTA initiates (605) the propagation of the planning target structures (411A', 412A') included in the planning session model 410A' obtain (606) a treatment session CBCT image 510 containing the propagated target structures (411B', 412B'). Namely, the RTT/MTA initiates propagation of the target volumes (CTV, PTV, etc.), OARs, and other anatomical structures of interest besides the influencer structures 413A that were present in the planning session model 410A'. The RTT/MTA can evaluate the obtained treatment session image (606) and if accepted, this image and associated image data becomes the treatment session patient model 610', as shown in FIGS. 9 and 10.

The propagation of the target structures (411A, 412A, 411A', 412B') from the planning CT image 310 of the planning patient model 410/410' can be done using a structure-guided deformable registration algorithm (Structure-Guided DIR) that registers the image data of the planning patient model 410A/410A' with the image data of the treatment session patient model 610/610', and which generates, as a result, one or more deformable vector fields (DVFs) used to propagate the target volumes (CTV, PTV, etc.), OARs, and other anatomical structures of interest from the planning CT image 310 of the planning patient model 410A/410A' to the treatment session CBCT image 510 of the treatment session patient model 610/610' using the contour propagation module 403A.

When influencers are used, the guided deformable registration is a deformable registration that is guided by the relationship between the influencer structures 413A that are present in the planning CT image 310 of the planning patient model 410A' and those 413B that were generated in the treatment session CBCT image 510.

Once the planning patient model 410/410' including the target structures (411A/411A', 412A/412A') on the CT image 310 and the treatment session patient model 610 including the target structures 411B/411B', 412B/412B') on the treatment session CBCT image 510 are obtained, the process S100 proceeds to determining (700) a similarity metric 710 between the planning patient model 410/410' and the treatment session patient model 610/610'.

The determining of the similarity metric includes calculating a coefficient/index/metric that gauges the similarity between the planning target structures (411A/411A', 412A/412A') and the corresponding treatment session target structures (411B/411B', 412B/412B').

An exemplary similarity metric is the Sorensen-Dice score (DSCi), which can be calculated using:

$$DSC_i = \frac{2|X_1^i \cap X_2^i|}{|X_1^i| + |X_2^i|}$$

where $X_1^i$ and $X_2^i$ are the sets of points belonging to a target structure i in a first image for which planning has already been done (i.e., a target structure 411A, 411A'/412A,412A' in the planning image of the planning patient model 410/410', or a target structure from a previous treatment session) and in a second image for which planning has not yet been done (i.e., the same target structure propagated onto the treatment session image of the treatment session patient model 411B/411B', 412B/412B').

Another exemplary similarity metric is the Jaccard index J (A, B), which can be calculated using:

$$J(A, B) = \frac{|A \cap B|}{|A \cup B|}$$

where A is a set of points belonging to a target structure in a first image for which planning has already been done (i.e., a target structure 411A, 411A'/412A,412A' in the planning image of the planning patient model 410/410', or a target structure from a previous treatment session) and B is a set of points belonging to the same target structure in a second image for which planning has not yet been done (i.e., the same target structure propagated onto the treatment session image of the treatment session patient model 411B/411B', 412B/412B').

Another exemplary similarity metric is the Hausdorf-metric which measures how far two subsets of a metric space are from each other. In the instant case, it would measure how far the set of points belonging to a target structure in a first image for which planning has already been done (i.e., a target structure 411A, 411A'/412A,412A' in the planning image of the planning patient model 410/410', or a target structure from a previous treatment session) are from the set of points belonging to the same target structure in a second image for which planning has not yet been done (i.e., the same target structure propagated onto the treatment session image of the treatment session patient model 411B/411B', 412B/412B').

Figure 14:
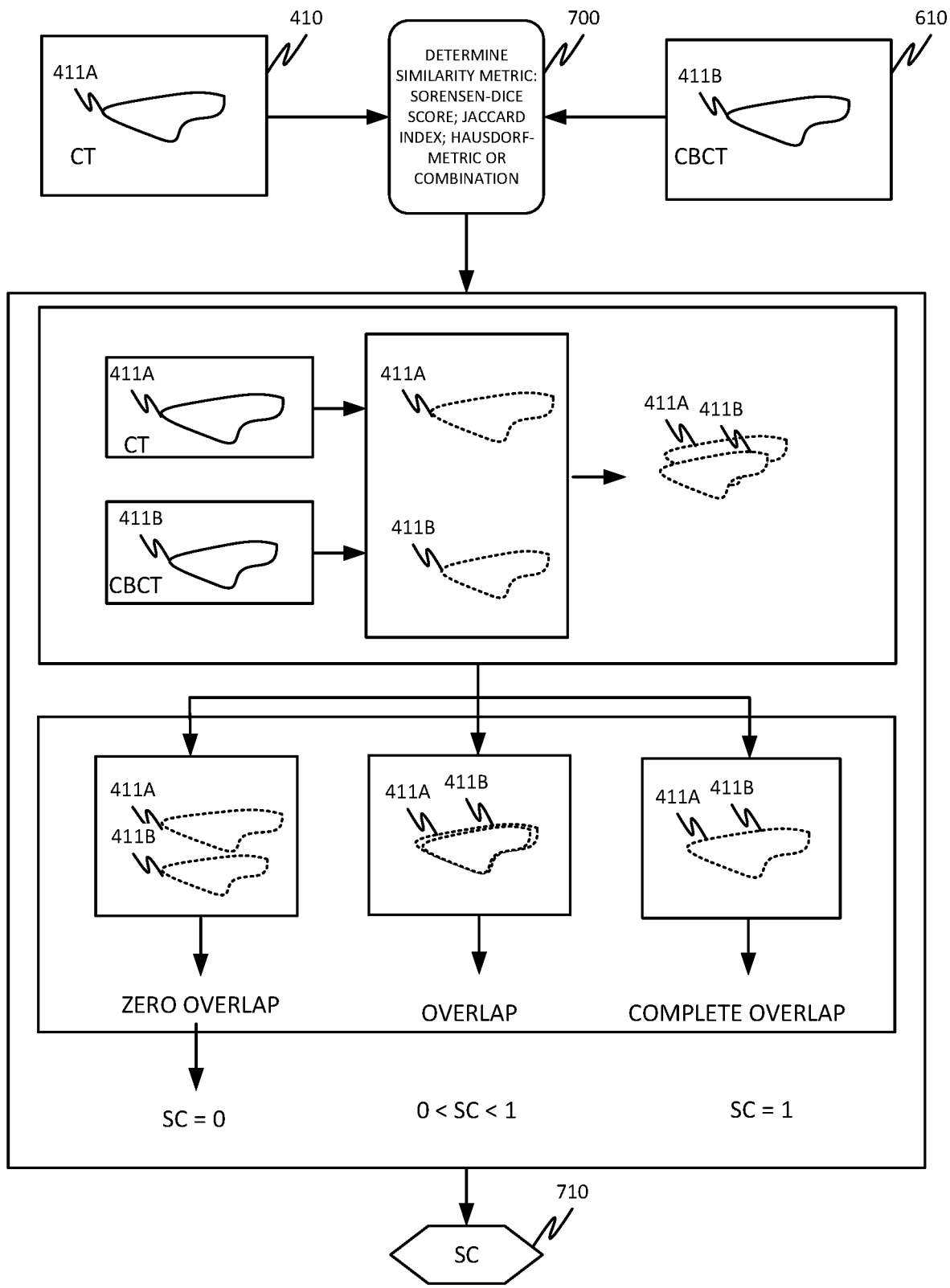
FIGS. 14-15 are illustrations of different similarity coefficient calculation processes, according to various embodiments of the disclosed subject matter.

An exemplary similarity metric determination 700 process is shown in FIG. 14, where the target structure 411A from the planning CT image 310 of the planning patient model 410 is compared with the corresponding target structure 411B from the treatment session CBCT image 510 of the treatment session patient model 610. This can be done by overlapping the two corresponding target structures.

If the contours 411A and 411B do not overlap at all (i.e., zero overlap), then the set of points of the target structure 411A of the planning image (first image) does not intersect with the set of points of the target structure 411B of the treatment session image (second image), and the similarity coefficient (SC) is zero (0). If the contours 411A and 411B overlap completely (i.e., complete overlap), then the set of points of the target structure 411A of the planning image (first image) intersects with all points in the set of points of the target structure 411B of the treatment session image (second image), and the similarity coefficient (SC) is one (1). If the contours 411A and 411B overlap partially (i.e., there is an overlap), then some points of the set of points of the target structure 411A of the planning image (first image) intersect with some points in the set of points of the target structure 411B of the treatment session image (second image), and the similarity coefficient (SC) is more than zero but less than 1.

The amount of similarity therefore depends on the amount of overlap between a target structure in one image (i.e., planning image) and the same target structure in another image (i.e., treatment session image).

Figure 15:
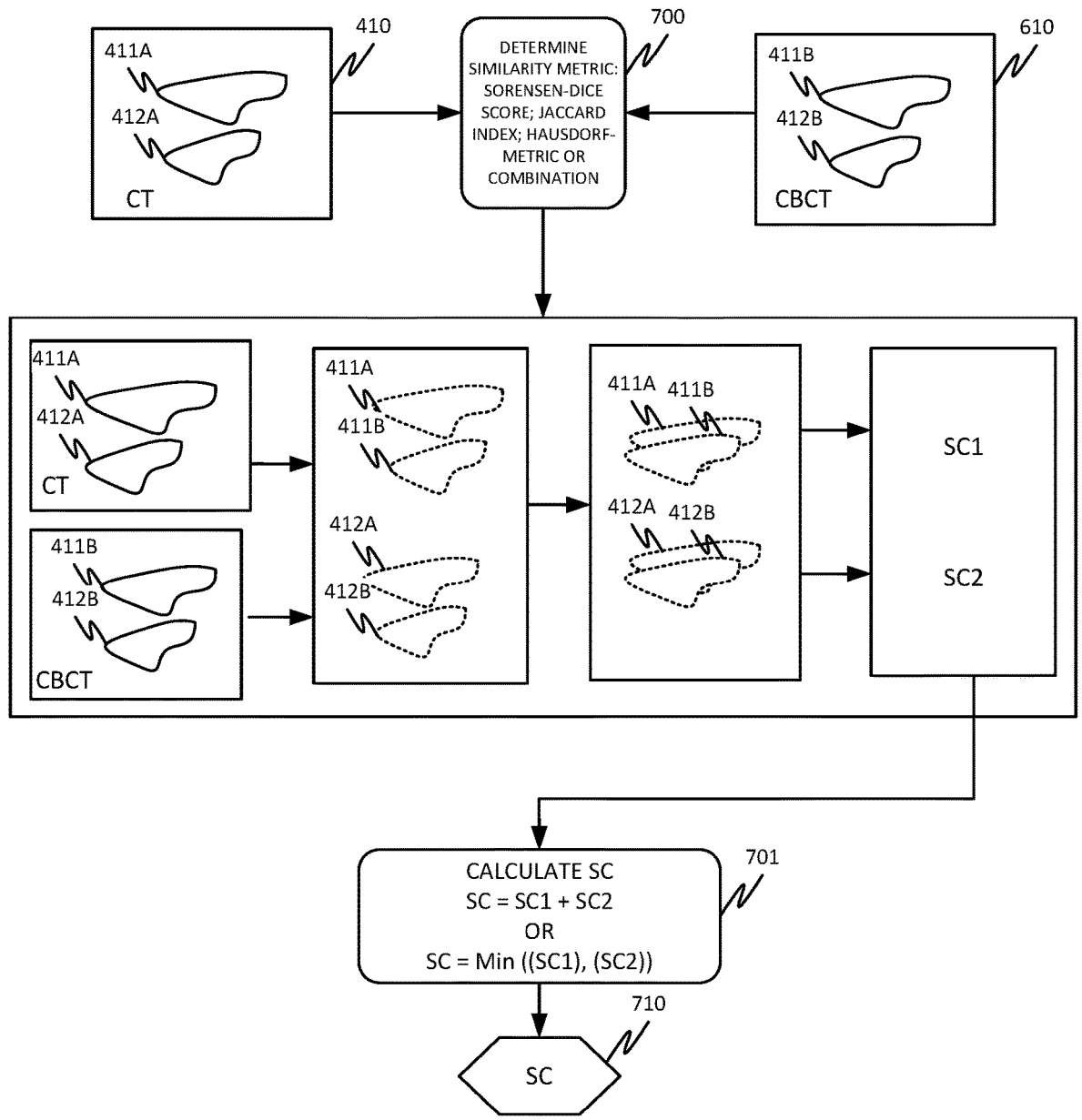

When there are multiple target structures present, each target structure in one image is compared with the corresponding target structure in the other image, and a total similarity coefficient is calculated based on individually calculated similarity coefficients. FIG. 15 illustrates an exemplary similarity metric determination process 700 where the planning CT image 310 of the planning patient model 410 contains a first target structure 411A and a second target structure 412A, and the treatment session CBCT image 510 of the treatment session patient model 610 contains corresponding target structures 411B and 412B. The target structures 411B and 412B are the propagated target structures 411A, 412A from the planning CT image 310 onto the current day CBCT treatment session image 510.

As shown in FIG. 15, the target structure 411A from the planning CT image of the planning patient model 410 is compared with the corresponding target structure 411B from the treatment session CBCT image of the treatment session patient model 610, and the target structure 412A from the planning CT image of the planning patient model 410 is compared with the corresponding target structure 412B from the treatment session CBCT image of the treatment session patient model 610.

The amount of overlap between contours 411A and 411B represents the similarity coefficient $SC_1$ between the first target structure in the first and second images, and the amount of overlap between contours 412A and 412B represents the similarity coefficient $SC_2$ of the second target structure in the first and second images.

The similarity coefficient (SC) 710 for this scenario is calculated as the sum of the similarity coefficients $SC_1$ and $SC_2$, or a minimum of the two similarity coefficients $SC_1$, $SC_2$.

If there are a plurality of target structures ($TS_n$) in the two images, namely, a plurality of target structures in the planning image of the planning patient model 410 (or a previously taken treatment session image) and corresponding plurality of propagated target structures on the current treatment session image, a similarity coefficient $SC_n$ is calculated for each corresponding pair of target structures, and the total similarity coefficient (SC) 710 is the sum of all similarity coefficients ($SC_n$), or the lowest of all the similarity coefficients (701):

$$SC = \sum_{1}^{n} SCn \text{ or}$$
$$SC = \text{Min}(SC_1, SC_2, \ldots, SC_n).$$

The similarity coefficient (SC) can also be calculated (701) by combining similarity coefficients obtained using different similarity metrics. For example, a Sorensen-Dice score DSC as well as a Jaccard index J (A, B) could be calculated for target structures 411A and 411B, and the similarity coefficient (SC) determined to be a sum of the DSC and J (A, B), or the Min (DSC, J (A, B)), for example. Obviously, any combination of different similarity metrics could be used for calculating a similarity coefficient (SC) 710.

For each calculation method of the similarity coefficient (SC) 710, a corresponding threshold value (c) needs to be set in advance. For example, for a similarity coefficient (SC) 710 calculated using the Sorensen-Dice score for a single target structure 411A, the threshold value may be 0.6, for example, whereas for multiple targets, the threshold value may be 1.3, for example, if SC is calculated using the sum of SCs, or the threshold may be 0.6 if the SC is calculated as the minimum of the SCs.

Figure 11:
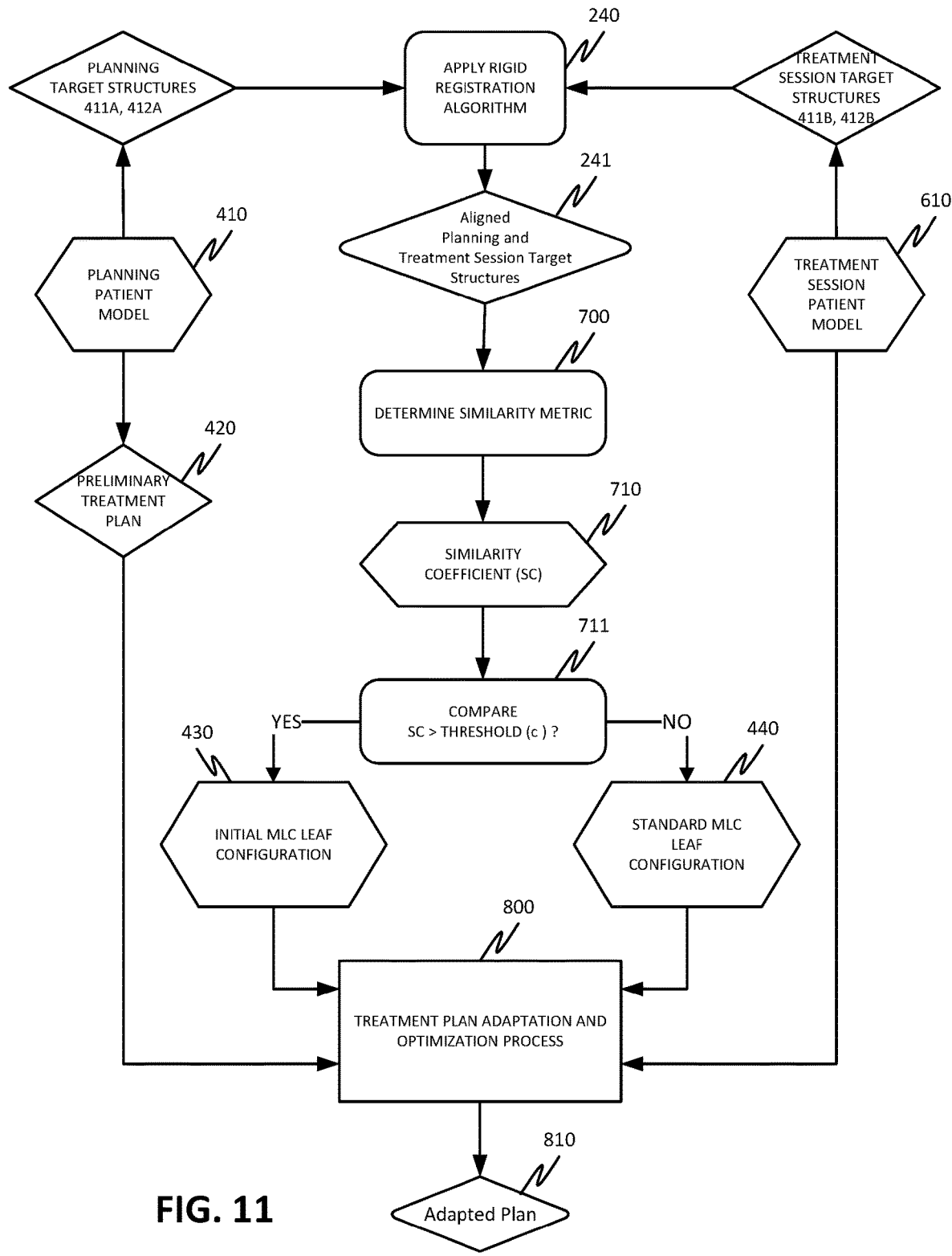
FIG. 11 is a process flow diagram for determining similarity metrics, according to various embodiments of the disclosed subject matter.

As shown in FIG. 11, before the similarity metric is determined, a rigid registration algorithm 240 may be applied between the two images, namely, between the planning CT image of the planning patient model 410 containing the planning target structures (411A, 412A, for example) and the treatment session CBCT image of the treatment session patient model 610 containing the corresponding treatment session target structures (412A, 412B, for example) in order to properly align the planning and treatment session target structures (241) prior to the comparing.

Figure 12:
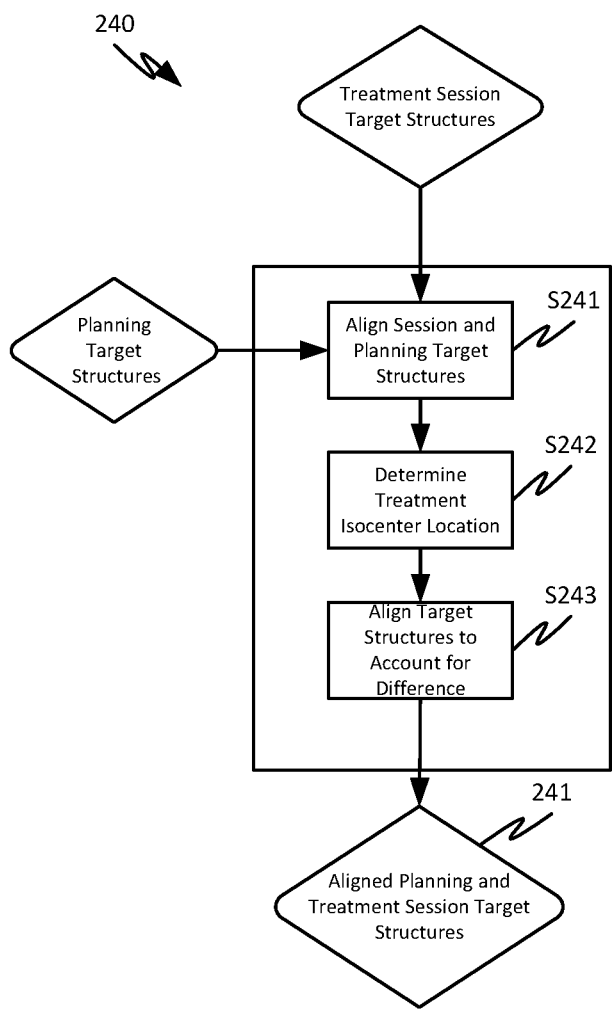
FIG. 12 is a process flow diagram for rigid registration between images, according to various embodiments of the disclosed subject matter.
Figure 13:
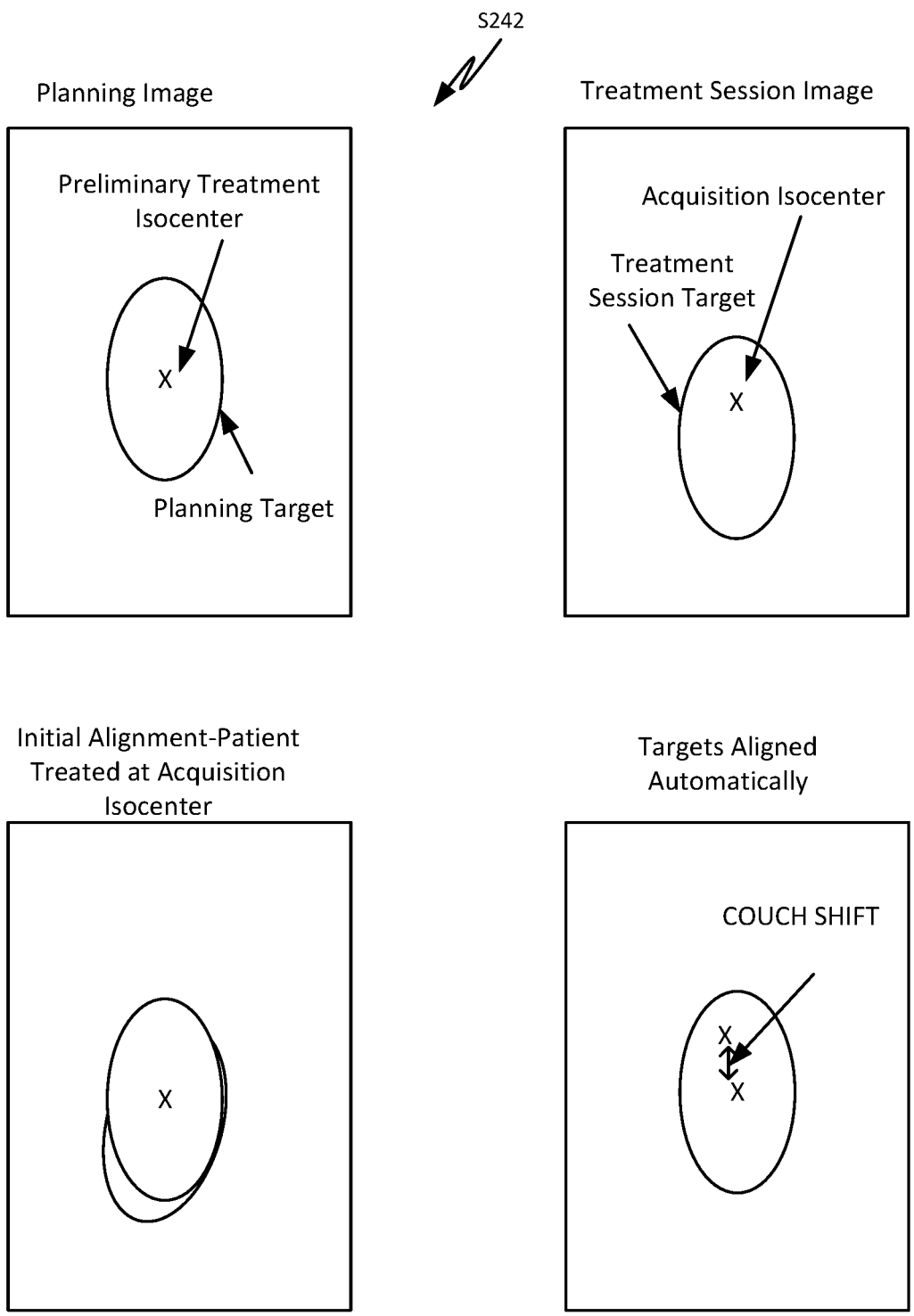
FIG. 13 is a process flow diagram for determining a treatment isocenter, according to various embodiments of the disclosed subject matter.

The rigid registration algorithm 240 may align the two image sets based on the difference S243 between the treatment isocenter location and the planning isocenter location S242 as shown in FIGS. 12-13. As shown in FIG. 13, when starting the adaptive workflow 220, the patient 110 is setup on the treatment couch 112 the same way as for a standard radiation therapy treatment. Therefore, after positioning the patient 110 on the treatment couch 112, the patient 110 is taken to the system 100 isocenter, using traditional skin marks indicating the location of the isocenter.

When the treatment session image (i.e., the CBCT image, for example) 510 is acquired, the center of the treatment session image 510 corresponds to the acquisition isocenter. If the patient 110 is treated by aligning the acquisition isocenter with the system isocenter, the patient 110 will not be treated correctly, since, as shown in FIG. 13, the session target volume does not align with the planning target volume.

In order to determine the correct treatment isocenter, once the RTT/MTA accepts the propagated target structures on the treatment session image 510, the system 100 is prompted at S241 to automatically align the planning target structure/volume of the planning patient model 410/410' to the treatment session target structure/volume of the treatment session patient model 610/610', as shown in FIG. 12.

As shown in FIG. 13, this alignment provides the difference between the acquisition isocenter and the reference treatment isocenter. From this difference, the translation (X, Y, Z) values, namely, by how much in the X, Y, and Z direction does the patient 110 need to be moved for the two isocenters to align, is calculated. The calculated translation values are then applied to the acquisition isocenter so that the treatment isocenter location is determined at S242.

Figure 17:
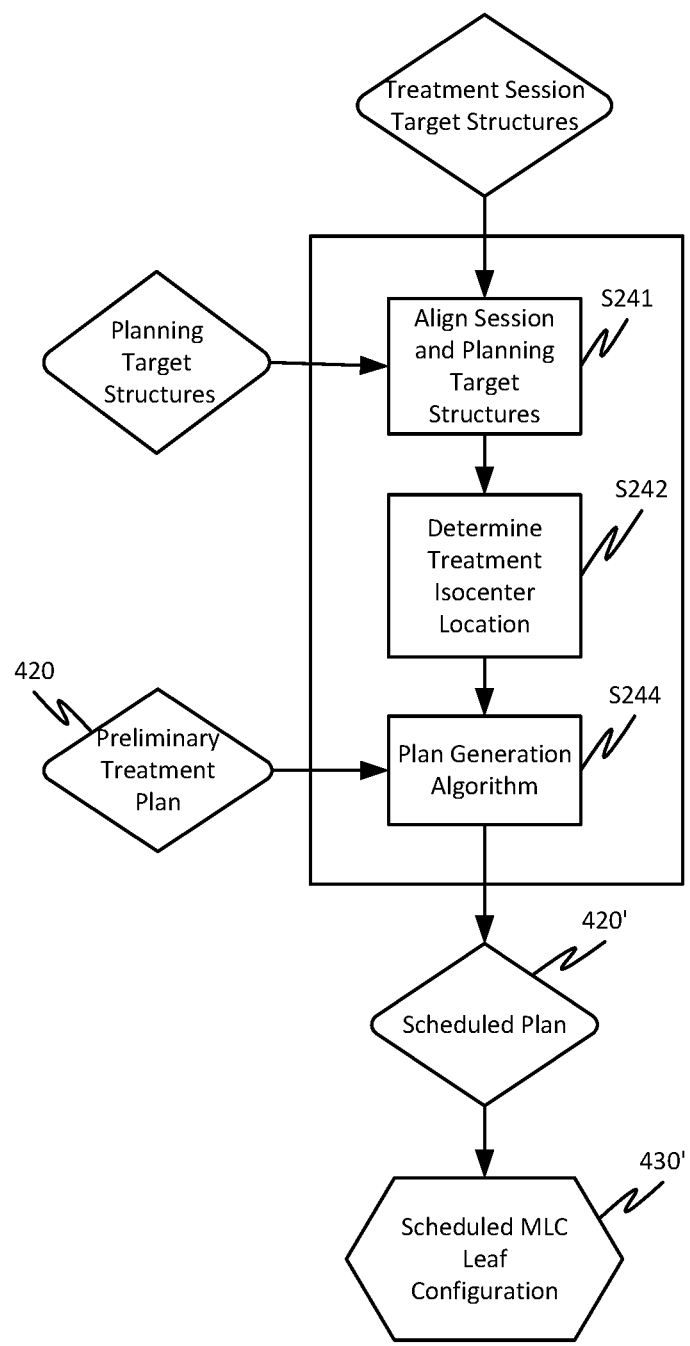
FIG. 17 is a process flow diagram for generating a scheduled treatment plan, various embodiments of the disclosed subject matter.

This treatment isocenter location can also be provided to the plan generation algorithm 402B which, using the information regarding the preliminary treatment plan 420 can generate a scheduled plan 420' as shown in FIG. 17. The scheduled plan 420' contains information regarding the new treatment couch 112 location, which will be communicated to the system 100 if the scheduled plan is selected for treatment. When the scheduled treatment plan contains a new treatment couch position, it forces the RTT/MTA to apply (move the treatment couch 112) to the new location.

Once the similarity metric is applied in 700 and a similarity coefficient (SC) 710 is calculated, the similarity coefficient (SC) 710 is compared (711) to the corresponding predetermined threshold (c). If the calculated similarity coefficient (SC) 710 is determined in 711 to be greater than the corresponding predetermined threshold (c), the initial MLC leaf configuration 430 corresponding to the preliminary treatment plan 420 associated with the planning patient model 410 is used as an input metric for the treatment plan adaptation and optimization process 800 to generate the adapted plan 810. If the calculated similarity coefficient (SC) 710 is determined in 711 to be less than the corresponding predetermined threshold (c), then a standard MLC leaf configuration 440 is used as an input metric for the treatment plan adaptation and optimization process 800 to generate the adapted plan 810. The standard MLC leaf configuration 440 is a predetermined MLC leaf configuration driven by the DICOM specification of the VMAT treatment plan that is preset as a default MLC leaf configuration used as input to a VMAT treatment plan optimization process.

Figure 16:
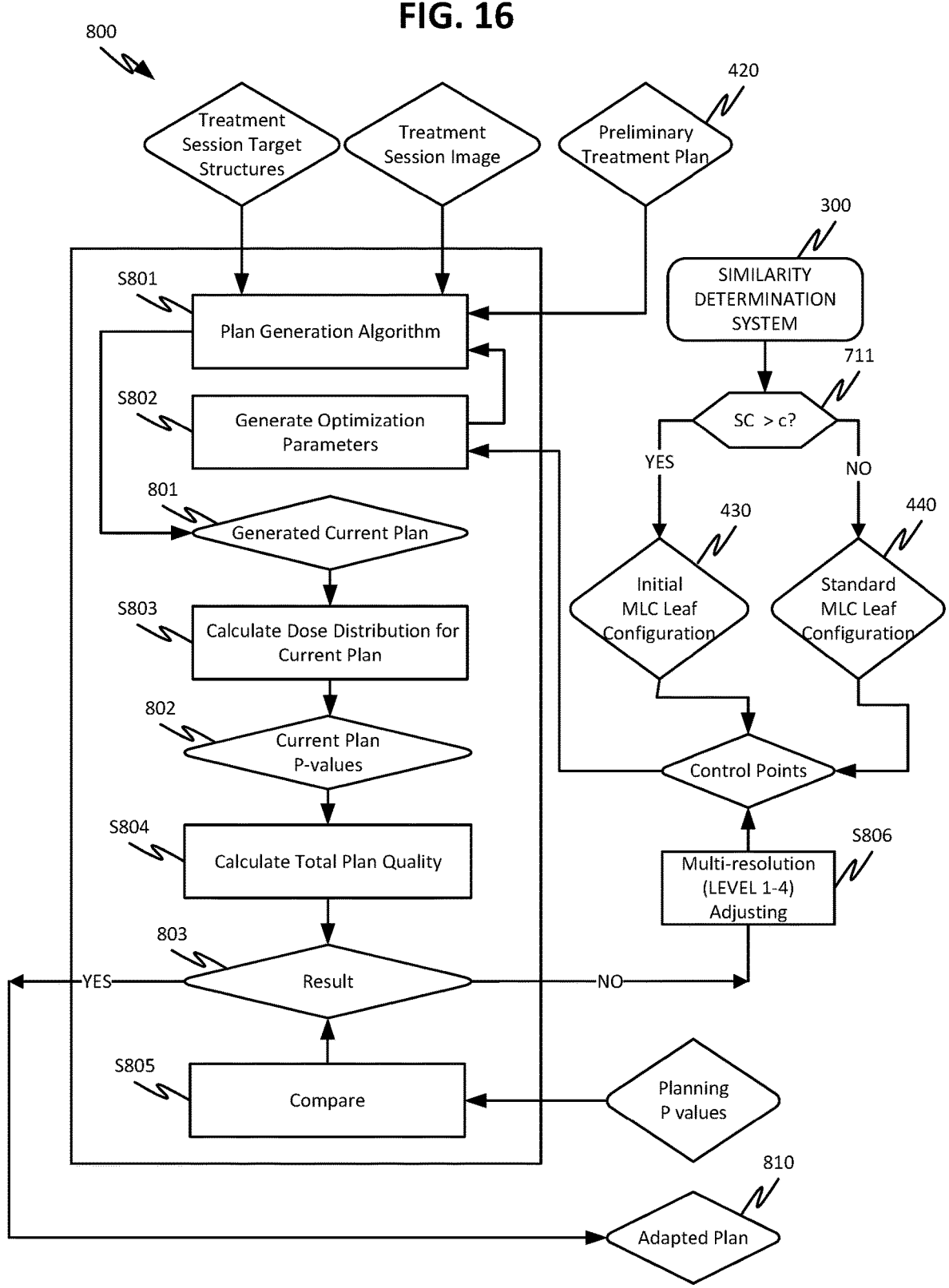
FIG. 16 is a process flow diagram for an automatic generation and optimization process of an adapted plan based on similarity metrics, according to various embodiments of the disclosed subject matter.

An exemplary treatment plan adaptation and optimization process 800 is shown in FIG. 16. In order to generate an adaptive plan 810, the propagated treatment session structures (i.e., target structures, OARs) and/or a synthetic (simulated) image (not shown) of the patient are used as inputs to a plan generation algorithm S801 to generate an optimized plan that is adapted to the current treatment session. Generally, a synthetic image is needed in order to generate a treatment plan from a stable and reproducible patient position. Generating a synthetic image involves a series of steps, including having to register the treatment session image with the planning image including the planning structures, using the result of the registration as an input to a deformable registration algorithm, and using the output from the deformable registration algorithm together with the data regarding the body outlines from the treatment session image as input to a synthetic image generation algorithm.

As shown in FIG. 16, the automated plan generation algorithm of S801 takes the propagated treatment session structures (i.e., target structure, OARs) as input to modify the preliminary treatment plan 420 based on the new anatomy. Based on the result 711 of the similarity determination 700, either the initial MLC leaf configuration 430 of the preliminary treatment plan 420 or the standard MLC leaf configuration 440 for one or more control points (CP) can be used to automatically generate in S802 a set of optimization parameters/criteria for the adaptive plan generation in S801.

For example, when the calculated similarity coefficient (SC) is greater than the corresponding predetermined threshold (c), the MLC leaf configurations for each control point (CP) in the preliminary treatment plan 420 is used as an input metric for the optimization algorithm in S802. The dose distribution for the current plan can then be calculated in S803. The calculated dose distribution indicates the actual dose distribution in the target structures and the OARs that can be achieved based on the current plan.

Since a mapping of the priority value P (i.e., priority 1, priority 2, priority 3, etc.) with respect to an original clinical goal (CG) to an achieved value of that goal (i.e., the actual dose achieved for that goal) gives the plan quality for that goal, a plan quality for the current plan with respect to an original clinical goal (CG) can be determined from the calculated dose distribution. This can be done by determining the priority value P corresponding to the actual dose value for that goal (802). In the case that the quality goal metrics are represented by quality functions (Q-functions), the P values can be read from the Q-functions generated for the clinical goals. The greater the value of the priority P for a goal, the better that goal has been met, and thus the better the quality of the plan for that goal.

From the calculated dose distribution of S803, therefore, a set of plan quality values Ps for the current plan can be obtained (802), one for each of the original clinical goals CG.

Optionally, an overall plan quality for the current plan can also be obtained in S804 from the individual current plan qualities by taking the minimum of all the individual goal quality values, for example.

Alternatively, the overall plan quality for the current plan can be obtained by defining an overall plan quality as one that minimizes the difference to the individual plan qualities.

Based on the value P of the overall quality of the current plan calculated in S804, a decision (803) can be made as to whether the current plan is acceptable in S805, in which case the current plan becomes the adapted plan 810. In case the current plan is not acceptable, the control points used as input to the optimization algorithm in S802 are automatically adjusted via multi-resolution adjusting in S806. Adjusting the control points changes the dose distribution in S803, which then changes the plan quality values of the current plan. The total plan quality is then again calculated in S804 to determine whether the subsequently obtained plan is acceptable or whether further adjusting of the control points in S806 is needed.

The multi-resolution adjusting in S806 allows multi-level (four levels for example) adjusting, from a coarse adjustment at level 1, to a fine adjustment at level 4. The level 4 adjustment allows for the fine tuning of the dose distribution.

For each iteration of the optimization algorithm, the decision as to whether the individual plan quality values or the overall plan quality value for the current plan are acceptable can be made by comparing in S805 the calculated quality values/value with the plan quality values/total plan quality value of the preliminary treatment plan, for example. If the differences exceed a predetermined threshold, the result is determined to not be acceptable, in which case the control points (CPs) are gradually modified in S806. The amount of adjustment, and thus the resolution level, can be determined based on the calculated differences.

When accepted, the adapted plan 810 is optimized to a dose distribution of similar dosimetric characteristics as the dose distribution of the originally planned treatment plan (i.e., preliminary treatment plan 420). Thus, the adapted plan 810 should meet the original clinical goals to a similar degree as the original/preliminary treatment plan 420.

If the similarity coefficient (SC) determined in 711 is less than the predetermined threshold (c), then the optimization process proceeds using the control point parameters associated with the standard MLC leaf configuration 440.

Figure 18:
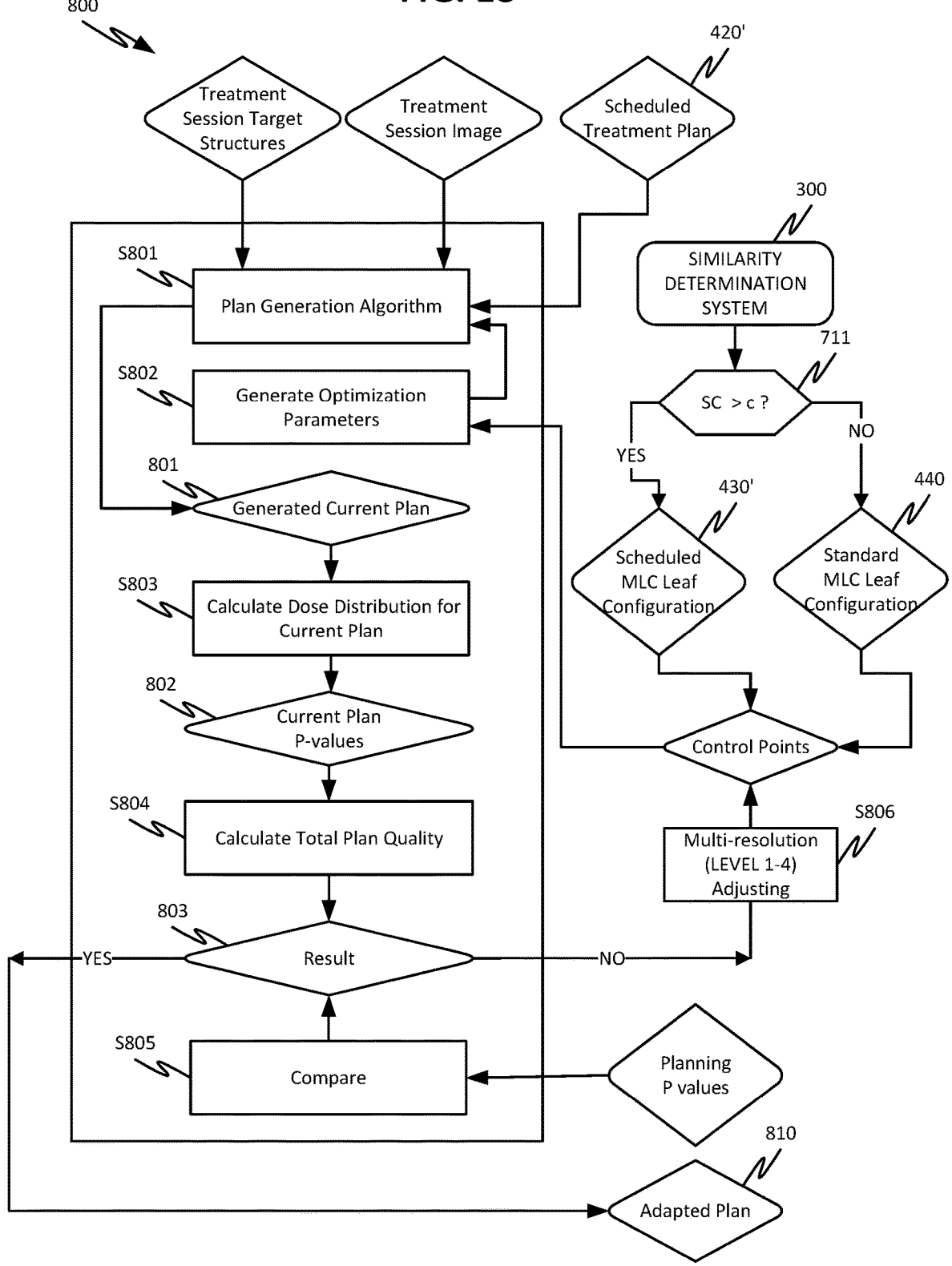
FIG. 18 is a process flow diagram for an automatic generation and optimization process of an adapted plan based on similarity metrics, according to various embodiments of the disclosed subject matter.

FIG. 18 shows a similar treatment plan adaptation and optimization process 800 is shown in FIG. 16, except that the scheduled treatment plan 420' is used as input to the adapted plan generation and optimization process. When the scheduled plan 420' is used, upon the determination that similarity coefficient (SC) is above the corresponding threshold (c), the MLC leaf configuration 430' of the scheduled treatment plan 420' is used to automatically generate in S802 a set of optimization parameters/criteria for the adaptive plan generation in S801. If the similarity coefficient (SC) is below the corresponding threshold (c), the standard MLC leaf configuration 440 for one or more control points (CP) is used to automatically generate in S802 a set of optimization parameters/criteria for the adaptive plan generation in S801.

Figure 19:
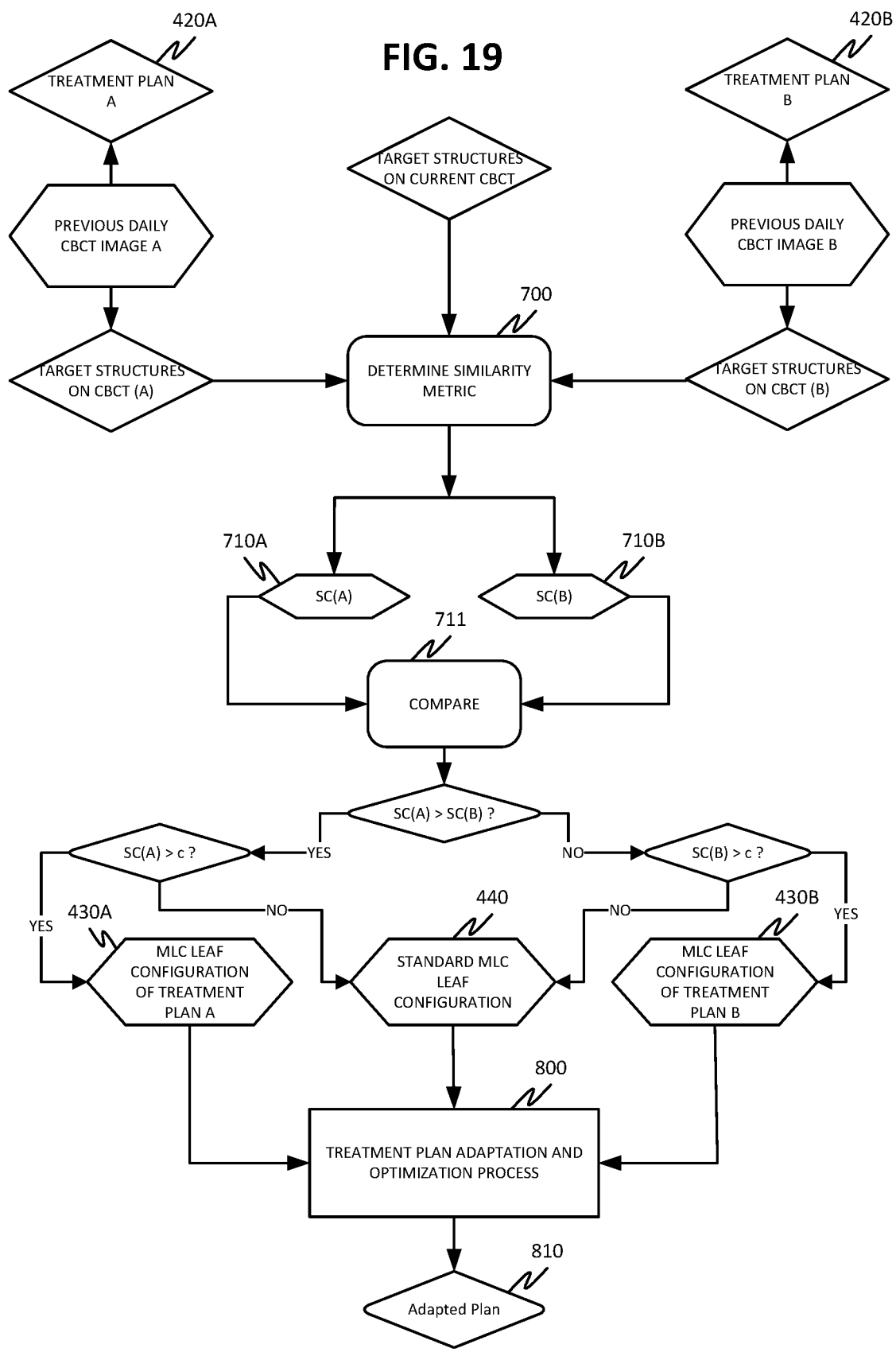
FIG. 19 is a process flow diagram for a similarity coefficient calculation process, according to various embodiments of the disclosed subject matter.
Figure 20:
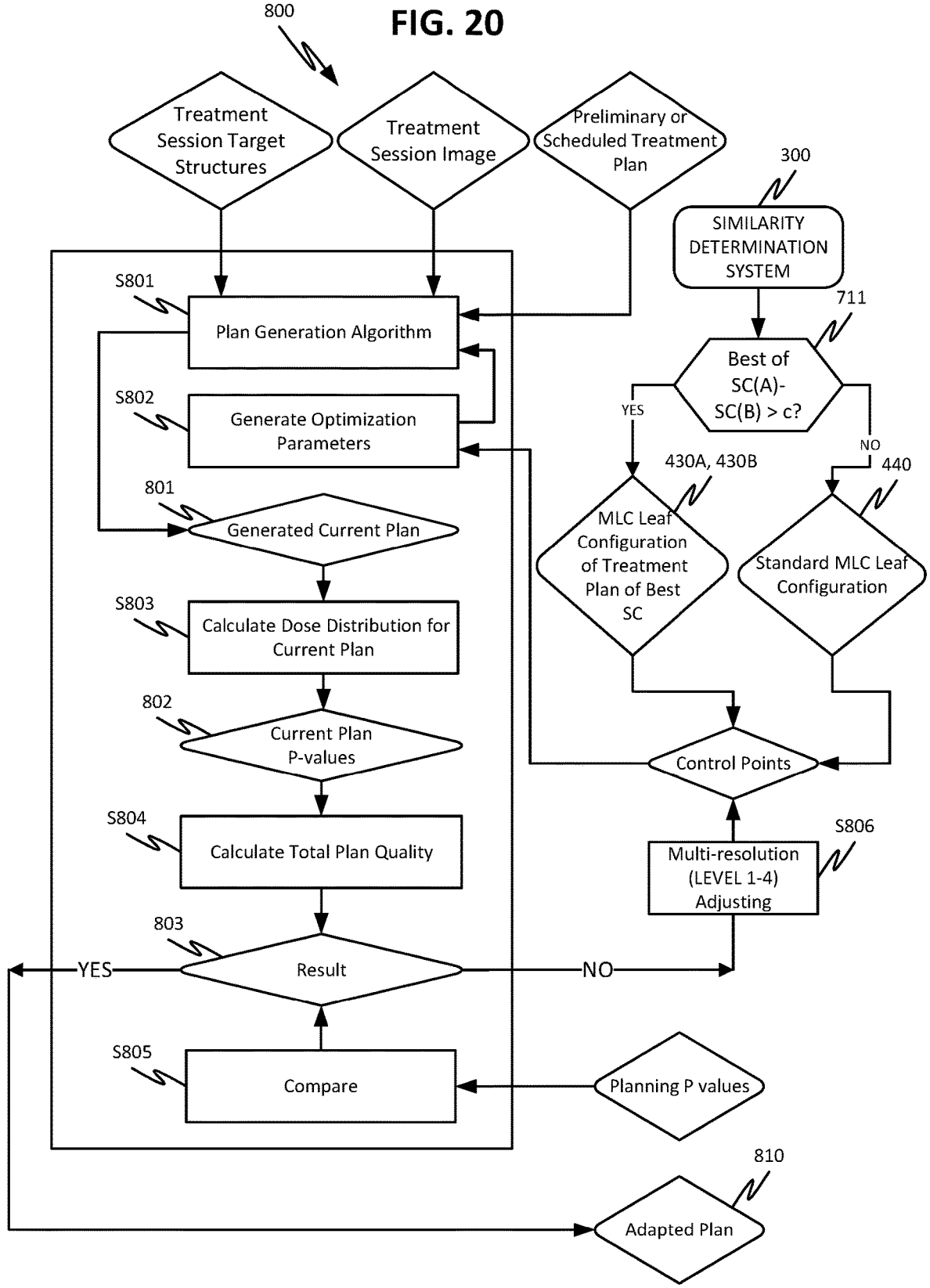
FIG. 20 is a process flow diagram for an automatic generation and optimization process of an adapted plan based on similarity metrics, according to various embodiments of the disclosed subject matter.

FIGS. 19 and 20 illustrate a case where instead of using the initial MLC leaf configuration corresponding to the preliminary treatment plan 420 as input to the optimization algorithm S802, the MLC leaf configuration of a different treatment plan can be used to obtain the adaptive treatment plan 810. Two treatment plans, treatment plan A and treatment plan B are shown in FIG. 19. Both treatment plans are associated with treatment plans generated for the same patient in previous treatment sessions. For example, treatment plan A corresponds to a treatment plan generated for a treatment session patient model obtained in a treatment session (i.e., treatment session A) previous to the current treatment session (i.e., a day earlier, for example). Treatment plan B, on the other hand, could be a treatment plan developed for a treatment session patient model obtained in a treatment session (i.e., treatment session B) previous to both the current treatment session and treatment session A (i.e., two days earlier, for example).

In order to determine which treatment plan MLC configuration to use as input to the treatment optimization algorithm in S802, first the similarity metrics for each of the two previous treatment session patient models are determined in 700. The treatment session patient model A includes the planned target structures propagated onto a treatment session CBCT image obtained a day earlier, for example (i.e., previous day CBCT image A). The target structures on the CBCT image A are compared to the target structures 411B, 412B on the current treatment session CBCT image 510 of the current treatment session patient model 610 using any of the previously described similarity metric calculation processes. Similarly, the treatment session patient model B, which includes the planned target structures propagated onto a treatment session CBCT image obtained two days earlier, for example (i.e., previous day CBCT image B), are compared to the target structures 411B, 412B on the current treatment session CBCT image 510 of the current treatment session patient model 610 using any of the previously described similarity metric calculation processes.

The similarity coefficient SC (A) 710A obtained for the treatment session patient model A is compared with the similarity coefficient SC (B) 710B obtained for the treatment session patient model B in 711. The similarity coefficient having the highest value between the two is next compared to a corresponding threshold (c), and if it is above the threshold, the MLC configuration of that treatment plan (MCL configuration of treatment plan A (430A) or MCL configuration of treatment plan B (430B)) is used as the input to the optimization algorithm of the treatment plan adaptation and optimization process 800 to obtain the adapted treatment plan 810. Otherwise, the standard MLC leaf configuration 440 is used as the input to the optimization process.

If there are multiple treatment session patient models and associated treatment plans, a similarity measure is made with respect to each treatment session patient model (i.e., similarity metric is calculated based on all previous daily CBCT images) and the optimization is performed using, as the MLC leaf configuration, the MLC leaf sequence from the highest scoring existing treatment plan. This way, the optimization process can take advantage of the benefits of previous optimizations in cases where the daily CBCT image is similar enough to the previously planned case. If none of the treatment plans score above the threshold (c), the MLC leaf sequence reverts to the standard leaf sequence.

The preliminary treatment plan 410, the scheduled treatment plan 420', and the adapted treatment plan 810 can be applied to the dose calculation algorithm of the dose calculation module 402A to calculate the respective radiation doses to be applied to the treatment session target structures/volumes according to the respective treatment plans. The preliminary, scheduled, and adapted dose matrices so generated can be sent together with the generated preliminary, scheduled and adapted plans and preliminary, scheduled, and adapted isodose values to the display device to be displayed for the RTT/MTA user, for the user to select 900 the appropriate plan to be delivered to the patient.

The RTT/MTA is also provided with one or more tools (hardware, software, etc.) to evaluate the scheduled plan and the adapted plan. The tools may include tools that provide Isodose distribution of the preliminary plan on the planned image, isodose distribution of the scheduled plan on the treatment session image, isodose distribution of the adapted plan on the session treatment image, Dose Volume Histograms (DVHs) of the preliminary plan, the scheduled plan and the adapted plan. The tools may also include tools for clinical goals evaluation to provide the planned clinical goal values, and the scheduled and adapted plan clinical actual values. Optionally, the RTT/MTA may be presented with other images, such as those from the internal radiation treatment, that may help in the plan selection process. The RTT/MTA can select what information to be displayed and what additional tools to use to help in the selection of the most appropriate plan.

The RTT/MTA uses the planned clinical goals and planned clinical goal values in the set of directives to quantitatively assess if the scheduled and/or the adapted plan is medically necessary for the treatment session of the day (i.e., the current treatment session). For this, the planned clinical goal values and the actual clinical values for the scheduled and adapted treatment plans are presented to the RTT/MTA on the display, and the RTT/MTA selects the treatment plan that provides the clinical values closest to the planned clinical goal values.

Once the user selects a treatment plan, the radiation treatment will proceed according to the selected plan 900.

The prescribing physician which generated the original/preliminary treatment plan 420, the adaptive directives 230, and the adaptive workflow 220, or any other qualified physician, can review and/or monitor the treatment delivery offline, as shown in FIG. 2.

Throughout the adaptive radiation treatment, plan checks can be validated to ensure delivery on the treatment device using DICOM artifacts (reference plan, images, structures, doses, etc.), which are provided for independent quality assurance. Optionally the independent validation application communicates back to the adaptive workflow application with the results of the validation (QA).

It is thus apparent that the disclosed subject matter enables the use of a similarity metric to determine optimization strategy in an adaptive radiation therapy.

It is also apparent that the disclosed subject matter enables an automated process for an adaptive radiation therapy session to obtain a set of directives including plan quality values of a preliminary treatment plan for a planning patient model; generate a treatment session patient model using information from the set of directives; determine a similarity metric between target structures of the planning patient model and corresponding target structures of the treatment session patient model; and generating an adapted treatment plan for the treatment session patient model by: using the preliminary treatment plan as input to a treatment plan generation algorithm to generate a current plan; the treatment plan generation algorithm including optimization parameters generated based on control points automatically selected based on the determined similarity metric; and generating the adapted treatment plan by optimizing the current plan based on the plan quality values of the preliminary treatment plan.

It is thus also apparent that the disclosed subject matter enables for a method for adapting a preliminary radiation treatment plan for a current treatment session of an adaptive radiation therapy session, comprising: obtaining a set of directives including plan quality values of a preliminary treatment plan for the patient; using the set of directives to perform a series of automated steps to generate a current treatment session patient model; determine a similarity metric between target structures of the current treatment session patient model and corresponding target structures of a plurality of previously obtained treatment session patient models; determine the previously obtained treatment session patient model that has the highest similarity metric value; and generate an adapted treatment plan for the current treatment session patient model by: using the preliminary treatment plan as input to a treatment plan generation algorithm to generate a current plan, the treatment plan generation algorithm including optimization parameters generated based on control points automatically selected based on the determined similarity metrics; and generating the adapted treatment plan by optimizing the current plan based on the plan quality values of the preliminary treatment plan, wherein the control points include MLC leaf configurations, and wherein a standard MLC leaf configuration is selected when the highest similarity metric value is below a predetermined threshold, and an MLC leaf configuration of a treatment plan of the previous treatment session patient model having the highest similarity metric value is selected when the highest similarity metric value is above the predetermined threshold.

It is also apparent that the disclosed subject matter enables a system for implementing an automated workflow for an adaptive radiation therapy session of a patient, comprising: a computer processing system configured to: obtain a set of directives including plan quality values of a preliminary treatment plan for the patient; and using the set of directives, perform a series of automated steps to: generate a current treatment session patient model; and generate an adapted treatment plan for the treatment session patient model by: using the preliminary treatment plan as input to a treatment plan generation algorithm to generate a current plan, optimizing the current plan based on optimization parameters generated based on control points selected based on a similarity metrics determined between target structures of the current treatment session patient model and corresponding target structures of either a planned patient model or one or more previously obtained treatment session patient models, wherein the control points include MLC leaf configurations, and wherein a standard MLC leaf configuration is selected when the highest similarity metric value is below a predetermined threshold, and an MLC leaf configuration of a treatment plan of the previous treatment session patient model having the highest similarity metric value is selected when the highest similarity metric value is above the predetermined threshold.

It will be appreciated that the aspects of the disclosed subject matter can be implemented, fully or partially, in hardware, hardware programmed by software, software instruction stored on a computer readable medium (e.g., a non-transitory computer readable medium), or any combination of the above.

For example, components of the disclosed subject matter, including components such as a controller, process, or any other feature, can include, but are not limited to, a personal computer or workstation or other such computing system that includes a processor, microprocessor, microcontroller device, or is comprised of control logic including integrated circuits such as, for example, an application specific integrated circuit (ASIC).

Features discussed herein can be performed on a single or distributed processor (single and/or multi-core), by components distributed across multiple computers or systems, or by components co-located in a single processor or system. For example, aspects of the disclosed subject matter can be implemented via a programmed general purpose computer, an integrated circuit device, (e.g., ASIC), a digital signal processor (DSP), an electronic device programmed with microcode (e.g., a microprocessor or microcontroller), a hard-wired electronic or logic circuit, a programmable logic circuit (e.g., programmable logic device (PLD), programmable logic array (PLA), field-programmable gate array (FPGA), programmable array logic (PAL)), software stored on a computer-readable medium or signal, an optical computing device, a networked system of electronic and/or optical devices, a special purpose computing device, a semiconductor chip, a software module or object stored on a computer-readable medium or signal.

When implemented in software, functions may be stored on or transmitted over as one or more instructions or code on a computer-readable medium. The steps of a method or algorithm disclosed herein may be embodied in a processor-executable software module, which may reside on a computer-readable medium. Instructions can be compiled from source code instructions provided in accordance with a programming language. The sequence of programmed instructions and data associated therewith can be stored in a computer-readable medium (e.g., a non-transitory computer readable medium), such as a computer memory or storage device, which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

As used herein, computer-readable media includes both computer storage media and communication media, including any medium that facilitates transfer of a computer program from one place to another. Thus, a storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a transmission medium (e.g., coaxial cable, fiber optic cable, twisted pair, digital subscriber line (DSL), or wireless technologies such as infrared, radio, and microwave), then the transmission medium is included in the definition of computer-readable medium. Moreover, the operations of a method or algorithm may reside as one of (or any combination of) or a set of codes and/or instructions on a machine readable medium and/or computer-readable medium, which may be incorporated into a computer program product.

One of ordinary skill in the art will readily appreciate that the above description is not exhaustive, and that aspects of the disclosed subject matter may be implemented other than as specifically disclosed above. Indeed, embodiments of the disclosed subject matter can be implemented in hardware and/or software using any known or later developed systems, structures, devices, and/or software by those of ordinary skill in the applicable art from the functional description provided herein.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

The terms "system," "device," and "module" have been used interchangeably herein, and the use of one term in the description of an embodiment does not preclude the application of the other terms to that embodiment or any other embodiment.

Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. An automated process for an adaptive radiation therapy session, comprising:
    obtaining a set of directives including plan quality values of a preliminary treatment plan for a planning patient model;
    generating a treatment session patient model using information from the set of directives;
    determine a similarity metric between target structures of the planning patient model and corresponding target structures of the treatment session patient model; and
    generating an adapted treatment plan for the treatment session patient model by:
        using the preliminary treatment plan as input to a treatment plan generation algorithm to generate a current plan;
        the treatment plan generation algorithm including optimization parameters generated based on control points automatically selected based on the determined similarity metric; and
        generating the adapted treatment plan by optimizing the current plan based on the plan quality values of the preliminary treatment plan.

2. The process of claim 1, wherein the target structures include one or more contours of a primary tumor and contours of one or more organs at risk (OARs).

3. The process of claim 2, wherein the set of directives includes information regarding planned radiation dose, planned clinical goals, planned clinical goal values, planning patient model, list of influencer structures, and control points.

4. The process of claim 3, wherein the generating of the treatment session patient model comprises:
    generating a treatment session image of a portion of the patient containing an anatomy of interest; and
    propagating the target structures of the planning image to the treatment session image.

5. The process of claim 4, wherein the propagating of the target structures is guided by one or more influencer structures from the list of influencer structures.

6. The process of claim 1, wherein the similarity metric is one of a Sorensen-Dice coefficient, a Jaccard index, a Hausdorf-metric, or a combination thereof.

7. The process of claim 6, wherein the similarity metric determination includes determination of amount of overlap between corresponding target structures.

8. The process of claim 7, further comprising applying a rigid registration between the planning patient model and the treatment session patient model prior to the similarity metric determination.

9. The process of claim 8, wherein the rigid registration includes:
    obtaining a planning isocenter location for the planning patient model from the set of directives;
    determining an acquisition isocenter location for the treatment session patient model;
    aligning the target structures in the treatment session patient model with the corresponding planning target structures in the planning patient model;
    determining a difference between the location of the planning isocenter and the location of the acquisition isocenter; and
    determining a treatment session isocenter location by applying the determined difference to the acquisition isocenter location.

10. The process of claim 6, wherein the control points include MLC leaf configurations.

11. The process of claim 10, wherein a standard MLC leaf configuration is selected when the similarity metric is below a predetermined threshold.

12. The process of claim 11, wherein MLC leaf configuration of the preliminary treatment plan is selected when the determined similarity metric is above the predetermined threshold.

13. The process of claim 12, wherein the treatment session isocenter location is used as an input to the plan generation and optimization algorithm.

14. The process of claim 1, wherein the planning image is a CT image or a CBCT image obtained in a previous treatment session, and the treatment session image is a current CBCT image.

15. The process of claim 1, further comprising:
    determining dose distribution for the current plan based on the selected control points;
    determining a plan quality value for the current plan based on the determined dose distribution; and
    comparing the determined plan quality value to the preliminary plan quality value,
    wherein the control points used for optimizing the current plan are incrementally adjusted based on the result of the comparison.

16. A method for adapting a preliminary radiation treatment plan for a current treatment session of an adaptive radiation therapy session, comprising:
    obtaining a set of directives including plan quality values of a preliminary treatment plan for the patient;
    using the set of directives to perform a series of automated steps to generate a current treatment session patient model;
    determine a similarity metric between target structures of the current treatment session patient model and corresponding target structures of a plurality of previously obtained treatment session patient models;
    determine the previously obtained treatment session patient model that has the highest similarity metric value; and
    generate an adapted treatment plan for the current treatment session patient model by:
    using the preliminary treatment plan as input to a treatment plan generation algorithm to generate a current plan,
    the treatment plan generation algorithm including optimization parameters generated based on control points automatically selected based on the determined similarity metrics; and
    generating the adapted treatment plan by optimizing the current plan based on the plan quality values of the preliminary treatment plan,
    wherein the control points include MLC leaf configurations, and
    wherein a standard MLC leaf configuration is selected when the highest similarity metric value is below a predetermined threshold, and
    an MLC leaf configuration of a treatment plan of the previous treatment session patient model having the highest similarity metric value is selected when the highest similarity metric value is above the predetermined threshold.

17. The process of claim 16, wherein the similarity metric is a Sorensen-Dice coefficient, a Jaccard index, a Hausdorf-metrics, or a combination thereof.

18. The process of claim 17, wherein the target structures include one or more contours of a primary tumor and contours of one or more organs at risk (OARs).

19. The process of claim 18, wherein the set of directives includes information regarding planned radiation dose, planned clinical goals, planned clinical goal values, planning patient model, list of influencer structures, and control points.

20. The process of claim 19, further comprising:

determining dose distribution for the current plan based on the selected control points;

determining a plan quality value for the current plan based on the determined dose distribution; and comparing the determined plan quality value to the preliminary plan quality value, wherein the control points used for optimizing the current plan are incrementally adjusted based on the result of the comparison.

21. A system for implementing an automated workflow for an adaptive radiation therapy session of a patient, comprising:

a computer processing system configured to:

obtaining a set of directives including plan quality values of a preliminary treatment plan for the patient; and using the set of directives, perform a series of automated steps to:

generate a current treatment session patient model; and generate an adapted treatment plan for the treatment session patient model by:

using the preliminary treatment plan as input to a treatment plan generation algorithm to generate a current plan, optimizing the current plan based on optimization parameters generated based on control points selected based on a similarity metrics determined between target structures of the current treatment session patient model and corresponding target structures of either a planned patient model or one or more previously obtained treatment session patient models, wherein the control points include MLC leaf configurations, and wherein a standard MLC leaf configuration is selected when the highest similarity metric value is below a predetermined threshold, and an MLC leaf configuration of a treatment plan of the previous treatment session patient model having the highest similarity metric value is selected when the highest similarity metric value is above the predetermined threshold.

\* \* \* \* \*